US010721517B2

(12) United States Patent
Wu et al.

(10) Patent No.: US 10,721,517 B2
(45) Date of Patent: Jul. 21, 2020

(54) METHOD AND SYSTEM FOR SYNCHRONOUSLY REPRODUCING MULTIMEDIA MULTI-INFORMATION

(71) Applicant: LIUZHOU GUITONG TECHNOLOGY CO., LTD., Guangxi (CN)

(72) Inventors: Jin Wu, Guangxi (CN); Zhenghai Kang, Guangxi (CN); Haitao Li, Guangxi (CN); Changzhu Yang, Guangxi (CN); Juanmei Qin, Guangxi (CN); Liangbo Tan, Guangxi (CN); Anhuo Xiao, Guangxi (CN); Baokun Wu, Guangxi (CN)

(73) Assignee: LIUZHOU GUITONG TECHNOLOGY CO., LTD., Guangxi (CN)

( * ) Notice: Subject to any disclaimer, the term of this patent is extended or adjusted under 35 U.S.C. 154(b) by 0 days.

(21) Appl. No.: 15/559,836

(22) PCT Filed: Mar. 18, 2016

(86) PCT No.: PCT/CN2016/076796
§ 371 (c)(1),
(2) Date: Sep. 20, 2017

(87) PCT Pub. No.: WO2016/150350
PCT Pub. Date: Sep. 29, 2016

(65) Prior Publication Data
US 2018/0091847 A1 Mar. 29, 2018

(30) Foreign Application Priority Data

Mar. 20, 2015 (CN) .......................... 2015 1 0124129
Mar. 20, 2015 (CN) .......................... 2015 1 0125236
(Continued)

(51) Int. Cl.
H04N 21/43 (2011.01)
H04N 5/76 (2006.01)
(Continued)

(52) U.S. Cl.
CPC ......... H04N 21/4307 (2013.01); G09B 19/14 (2013.01); G09B 19/167 (2013.01);
(Continued)

(58) Field of Classification Search
CPC .... H04N 21/4307; H04N 19/46; H04N 19/68; G09B 19/14; G09B 19/167; G11B 27/10
See application file for complete search history.

(56) References Cited

U.S. PATENT DOCUMENTS 6,606,448 B1 * 8/2003 Terauchi .................. H04N 5/76
348/152
6,859,609 B1 * 2/2005 Watkins ................. H04N 5/772
386/231
(Continued)

FOREIGN PATENT DOCUMENTS

CN 101137008 A 3/2008
CN 102056015 A 5/2011
(Continued)

Primary Examiner — Mishawn N. Hunter
(74) Attorney, Agent, or Firm — Gang Yu

(57) ABSTRACT

Disclosed is a method and system for synchronously reproducing multi-media multi-information. The method is a method of combining a plurality of relevant files or a plurality of information streams that have an associated information relationship using a "multi-information modulation unit", and then synchronously reproducing the relevant files or the information streams using a dedicated player capable of synchronously reproducing and playing back the multi-information. The step of synchronously recording the multi-information in the method is to insert "non-audio/video information" into an "audio/video steam before compression or after compression or a file thereof"
(Continued)

using the "multi-information modulation unit", that is, to embed some "additional information blocks" carrying the "non-audio/video information" into necessary "video frames" or "audio frames" and/or create or insert some "additional information frames" carrying the "non-audio/video information" between the necessary "video frames" and "audio frames".

6 Claims, 11 Drawing Sheets

(30) Foreign Application Priority Data

Jun. 9, 2015 (CN) .......................... 2015 1 0310713
Jun. 9, 2015 (CN) .......................... 2015 1 0311512

(51) Int. Cl.
*H04N 21/414* (2011.01)
*H04N 19/46* (2014.01)
*H04N 19/68* (2014.01)
*G09B 19/14* (2006.01)
*G09B 19/16* (2006.01)
*G11B 27/10* (2006.01)
*H04N 5/92* (2006.01)
*H04N 21/2347* (2011.01)
*H04N 21/2368* (2011.01)
*H04N 21/2383* (2011.01)
*H04N 21/258* (2011.01)
*H04N 21/422* (2011.01)
*H04N 21/4223* (2011.01)
*H04N 21/433* (2011.01)
*H04N 21/439* (2011.01)

(52) U.S. Cl.
CPC ............... *G11B 27/10* (2013.01); *H04N 5/76* (2013.01); *H04N 5/9202* (2013.01); *H04N 19/46* (2014.11); *H04N 19/68* (2014.11); *H04N 21/2347* (2013.01); *H04N 21/2368* (2013.01); *H04N 21/2383* (2013.01); *H04N 21/25875* (2013.01); *H04N 21/41422* (2013.01); *H04N 21/4223* (2013.01); *H04N 21/42203* (2013.01); *H04N 21/439* (2013.01); *H04N 21/4333* (2013.01)

(56) References Cited

U.S. PATENT DOCUMENTS

2004/0247291 A1* 12/2004 Hamamoto .......... H04N 9/7921
  386/231
2005/0025462 A1* 2/2005 Chang .................. H04N 9/8042
  386/328
2007/0047901 A1* 3/2007 Ando .................. G11B 27/105
  386/241
2010/0254455 A1* 10/2010 Matsunaga .......... H04N 13/189
  375/240.12

FOREIGN PATENT DOCUMENTS

| CN | 102223487 A | 10/2011 |
| CN | 103020624 A | 4/2013 |
| CN | 104346974 A | 2/2015 |
| CN | 104869342 A | 8/2015 |
| CN | 104918016 A | 9/2015 |
| EP | 0949821 A2 | 10/1999 |

* cited by examiner

METHOD AND SYSTEM FOR SYNCHRONOUSLY REPRODUCING MULTIMEDIA MULTI-INFORMATION

TECHNICAL FIELD

The disclosure relates to the field of information processing, and more particularly, to a method and system for synchronously reproducing multimedia multi-information.

BACKGROUND

When a set of multi-media multi-information that concurrently involve in information such as sounds, images and words, whereabouts and behaviors is stored, played back, retrieved and queried, there is a need to use a plurality of software and hardware devices and systems as well as means and methods at present.

1. A common multi-media multi-information set include:

(1) Information contained in authorization and testing processes of China's Ministry of Public Security on a motor vehicle driving license:

1.1 Real-time video information of not less than two channels;

1.2 Real-time audio information in a driving cab of a test car;

1.3 Real-time conversation information between a tester and a testee in a monitoring center;

1.4 Real-time position information in a driving process of the test car;

1.5 Information of a test vehicle (test car) used by the testee in testing;

1.6 Information of the tester responsible for monitoring some testee;

1.7 Information of the testee who is being tested;

1.8 Test scores of the testee and judgment basis thereof;

1.9 Real-time information such as real-time audio and video information which is required to be recorded when a score deduction assessment is performed on the testee, position where the test car locates at this moment, and moment-to-moment information at that time;

1.10 Some other information which are not explicitly specified by a national standard and are considered to be added necessarily by some testing places, such as the following information in the process when the testee is enrolled, studies and is tested:

1.101 Information to be recorded when monitoring a physical examination process of a person who is enrolled to study motor vehicle driving skills as well as a driver and other persons;

1.102 Audio/video information when monitoring the physical examination process;

1.103 Information of physical examination personnel and an examinee;

1.104 Information of a physical examination unit;

1.105 Information of a physical examination result.

(2) Information to be recorded when monitoring an inspection process of safety and technical performances of the motor vehicle:

2.1 Audio/video information in monitoring and annual inspection processes;

2.2 Relevant information to be provided in annual inspection of the motor vehicle;

2.3 Information of an annual inspection unit, an inspector and an instructor, and 2.4 Information of an inspection result.

(3) Information to be related at various accident sites:

3.1 Audio/video information in a site exploration process;

3.2 Exploration, survey crew and generated site information;

3.3 Information of a site handling unit and personnel responsible for site handling at that time; and 3.4 Information of a site handling result.

(4) Some other information to be involved in various real-time monitoring processes:

4.1 Information such as audio, video, real time, traveling track and relevant scheduling and management generated in daily monitoring and real-time tracking processes of vehicles which carry out a special task such as cash truck and dangerous goods transport vehicle;

4.2 Relevant information needed to strictly control each corresponding stage of product monitoring and inspection processes using means such as sounds and images;

4.3 Various information to be managed in vehicle registration and 4S store service monitoring;

4.4 Relevant information required in a bank service monitoring process;

4.5 Sounds, images, pictures and correspondingly all other documents used as evidences;

4.6 In measurement, analysis and teaching processes, there often exist some information transferred from sounds generated by means of lighting or vibration and factors thereof generating these information, for example, an incandescent lamp will light when there is a certain current, and within a certain current range, the light intensity will be in direct proportion to the current which makes the lamp light.

2. Existing methods for synchronously reproducing the multi-media multi-information:

When the set of the multi-media multi-information which concurrently involve in the information such as sounds, images and words, whereabouts and behaviors is stored, played back, retrieved and queried, the following numerous technologies are adopted for integration at present:

1. The sounds/images are synchronously collected and recorded by means of an audio/video collecting and recording system.

2. The non-sound/image information is recorded by means of a computer database system.

3. When the multi-media multi-information is traced, a corresponding sound/image player is played back or restored. The non-sound/image information is searched, queried and displayed by means of a database query system. The moment-to-moment position where a monitored object locates corresponding to that time is simulated by comprehensively employing the database query system and a virtual technology to display and restore.

After relevant regulations of China's Ministry of Public Security on authorization and testing processes of the motor vehicle driving license are modified from the previous decree No. 111 to the decree No. 123, a method for evaluating a driving skill testing process of a motor vehicle testee is changed to be done mainly by means of a computer from a manpower. Moreover, it is required that all information of the whole testing process can be traced at any time, that is, the testing process of any testee can be played back or restored completely at any time so as to review or correct an error accurately.

To record the complete information of one testee in the testing process, the following numerous technologies are adopted for integration in the related art:

1. The audio/video inside and outside the test car are collected and recorded by means of the audio/video collecting and recording system.

2. The information such as test car, testee, tester, testing time, test scores, judgment basis and real-time position of the test car in the driving process is recorded by means of the computer database system.

3. When the testing process of the testee is traced, the audio/video information is played back or restored using the corresponding audio/video player. The information such as test car, testee, tester, testing time, test scores, judgment basis and moment-to-moment information is searched, queried and displayed by means of the database query system.

The moment-to-moment position where the test car locates is searched and queried using the database query system and is simulated using the virtual technology to display and restore.

3. Defects of the existing methods for synchronously reproducing the multi-media multi-information:

(1) When the process information is traced, a plurality of systems which cannot be associated concurrently and correspondingly on a matter of time is required to be used. As a result, the problem that the information such as sounds, images and pictures are synchronous to other various information such as non-sound, non-image and non-picture information cannot be solved in a playback no matter in theory or in practice. For example:

When the driving skill testing process of the driver is recorded, a plurality of information set documents is needed. When the video and the traveling track need to be reproduced, an asynchronous phenomenon is particularly prominent, and a time difference between the traveling track depicted asynchronously and a video signal recorded by the test vehicle in real time is uncertain and is not able to be controlled at all. As a result, it is very easy to cause a visual error, and when judging a score deduction point, an observer will consider that it is a judgment error and even has a suspicion or a dispute to the correctness.

When the physical examination is performed on the person who needs to learn the motor vehicle driving skill before the enrollment, to avoid the unhealthy tendency, prevent the falsification and guarantee the justice and equity, it is specified in a new standard that corresponding work should not be allowed to be done by a physical examination organization affiliated to the vehicle administration office under the real-time monitoring of polices of the vehicle administration office, but should be done by a neutral hospital not intervened by the vehicle administration office directly and having a physical examination qualification as a third party. At this moment, to guarantee the authenticity of a physical examination result and implement the effective process monitoring, there is a need to combine the audio/video information as evidences. Now, there occurs that the reproduced information has an obvious time asynchronous problem in monitoring inspection: the physical examination result represented by the words has not a fixed time relationship with the audio and the video in the physical examination process.

(2) When static information and dynamic information occurred at any moment are stored using a current database technology, for example, when the static information such as test car, testee, tester, testing time, test scores, judgment basis and moment-to-moment information as well as the dynamic information of the test car position are stored using the current database technology, due to the universality of an interface and the openness of the technology, the security cannot be guaranteed and the information is falsified by a lawbreaker very easily, thereby damaging the authenticity of information data.

(3) When the static information irrelevant to a time and the dynamic information in one-to-one corresponding relation with the time are stored using the current database technology, the information is respectively stored to multiple different types of documents. For example, as the test information of the same testee is respectively stored to the multiple different types of the documents, it is very troublesome, labor-consuming and time-consuming to find it. If the information needs to be synchronously reproduced, it becomes more difficult, and sometimes the time difference even exceeds 10 min.

SUMMARY

The embodiments of the disclosure provide a method and system for synchronously reproducing multimedia multi-information, so as to solve the above problems in the related art.

According to one aspect of the embodiments of the disclosure, a method for synchronously reproducing multimedia multi-information is provided. The method is a method of combining a plurality of relevant files or a plurality of information streams by a "multi-information modulation unit", and then synchronously reproducing the plurality of relevant files or the plurality of information streams by a dedicated player capable of synchronously reproducing and playing back the multi-information, wherein the plurality of relevant files have an associated information relationship, the plurality of information streams have an associated information relationship. The method includes the following basic steps: A, a step of synchronously recording the multi-information: the step is to insert "on-audio/video information" into an "audio/video steam before compression" or an "audio/video steam after compression or a file thereof" by a "multi-information mixer" of the "multi-information modulation unit", that is, to embed some "additional information blocks" carrying the "non-audio/video information" into necessary "video frames" or "audio frames" in the "audio/video steam before compression" or the "audio/video steam after compression or the file thereof"; and/or, to create or insert some "additional information frames" carrying the "non-audio/video information" between the necessary "video frames" and "audio frames", thereby finally forming a new multimedia multi-information audio/video stream CMSAV or multimedia multi-information file CMSAVF, wherein the multimedia multi-information audio/video stream CMSAV and the multimedia multi-information file CMSAVF meet requirements of a certain compression standard; and B, a step of synchronously reproducing the multi-information: the step is to, after enabling the "multimedia multi-information file CMSAVF", which carries the "non-audio/video information" and seemingly still is an audio and a video suitable which meets the requirements of the certain compression standard, to pass through a "multi-information file demodulator" using a "multi-information synchronous reproducing unit" that is a "multimedia multi-information demodulation unit", respectively obtain three information sets, namely the "additional information blocks", the "video frames" and the "audio frames", and then send the "video frames" and the "audio frames" taken as basic units of "multimedia stream information" to an "audio/video decoder or player" to restore audio/video information and scenes before being recorded, and perform corresponding "demodulation" or called as "decoding" processing on the "additional information blocks" obtained by demodulation from the "multimedia multi-information file CMSAVF" again to restore the "non-audio/video information" embedded into the "multimedia multi-information file CMSAVF".

According to another aspect of the embodiments of the disclosure, a method for synchronously reproducing multimedia multi-information is further provided. The method is to respectively convert multi-channel audio information of a driving test into single-channel audio information HAS and convert multi-channel video information of the driving test into single-channel video information CVS, wherein the multi-channel audio information and the multi-channel video information are collected concurrently; then store the single-channel audio information HAS, the single-channel video information CVS and all information relevant to the driving test, such as, testee information, test scores, tester information and test vehicle information as well as indispensable real-time non-audio/video test information and non-real-time test information specified in a national standard or other requirements, together to all audio/video monitoring information which carries a testing process of testees, and form, in a form of a compressed file, a "driver testing process multi-information audio/video file DEMSAV" which includes various information of a driving testing process; and then synchronously reproduce all information recorded in the "driver testing process multi-information audio/video file DEMSAV" of a multi-information driving test synchronous recording process using a dedicated player capable of synchronously reproducing and playing back the multi-information. The method mainly includes three steps: (1) a step of collecting: multi-channel audio and multi-channels video are respectively converted into single-channel audio HAS and video CVS; (2) a step of storing: information collected in the step of collecting is combined with the real-time non-audio/video test information and the non-real-time test information to form the "driver testing process multi-information audio/video file DEMSAV" which includes the various information of the driving testing process; and (3) a step of synchronously reproducing: the all information recorded in the "driver testing process multi-information audio/video file DEMSAV" of the multi-information driving test synchronous recording process is synchronously reproduced using the dedicated player capable of synchronously reproducing and playing back the multi-information.

According to another aspect of the embodiments of the disclosure, a system for synchronously reproducing multimedia multi-information is further provided. The system includes a multi-information modulation unit, a multi-information synchronous reproducing unit that is a multi-information demodulation unit (IV), and a system hardware platform (V) The multi-information modulation unit is a member configured to combine a plurality of relevant information having an associated information relationship together, that is, to insert "non-audio/video information" into an "audio/video steam after compression or a file thereof" to form a multimedia multi-information audio/video stream CMSAV, which seemingly still is the audio/video stream or the file thereof in a previous format on a universal multimedia player, or a multimedia multi-information file CMSAVF thereof. The multi-information synchronous reproducing unit (IV) is a member configured to synchronously reproduce and play back the "multimedia multi-information file CMSAVF" which carries the "non-audio/video information" and seemingly still is the audio/video file in the previous format to the universal multimedia player after "multi-information file demodulation". The system hardware platform (V) is a software and hardware platform of a modem configured to generate the "multimedia multi-information file CMSAVF" and restore various information existed in the "multimedia multi-information file CMSAVF". The system hardware platform (V) includes all members that are able to be operated to generate the "multimedia multi-information file CMSAVF" which seemingly still is the audio/video file in the previous format to a universal multimedia player and are required when the "multimedia multi-information file CMSAVF" is played. A platform here includes a universal Personal Computer (PC) with a central processor of which a Central Processing Unit (CPU) is compatible to an x86 series, a tablet computer with a central controller of which a Microprogrammed Control Unit (MCU) is compatible to an Asynchronous Response Mode (ARM) series, a mobile terminal which is commonly seen at present such as intelligent mobile phone, as well as all members and function extension members which are customized and dedicated to operate to generate the "multimedia multi-information file CMSAVF" that seemingly still is the audio/video file in the previous format to the universal multimedia player and are required when the "multimedia multi-information file CMSAVF" is played. The members here include hardware devices and software embedded into the hardware devices. The system hardware platform includes a hardware platform core module (V1), and a hardware platform interface bottom plate (V2). The hardware platform core module (V1) is a combination of software and hardware capable of accomplishing data processing, wherein one kind of the hardware platform core module (V1) is a PC computer system with a central processor of which a CPU is x86 or compatible with x86, and other kind of the hardware platform core module (V1) is an embedded platform, a mobile terminal device, a tablet computer, an intelligent television, and intelligent mobile phone with the ARM and compatible MCU thereof as a core, as well as the all members and the function extension members which are customized and dedicated to operate to generate the "multimedia multi-information file CMSAVF" which seemingly still is the audio/video file in the previous format to the universal multimedia player and are required when the "multimedia multi-information file CMSAVF" is played. The hardware platform interface bottom plate (V2) is an interface device which provides various services required by signal input and output as well as networking for the hardware platform core module (V1). The hardware platform core module (V1) includes: various buses (V10) on the core module, which are common channels configured to enable CPU or MCU or a Digital Signal Processor (DSP) to be able to obtain data required in an operation and to access all devices connected with bottom plate; the CPU or the MCU (V11), which employs an "x86 series or compatible CPU thereof" or an "ARM series or compatible MCU thereof" and is configured to operate all softwares required for generating the "multimedia multi-information file CMSAVF" and playing the "multimedia multi-information file CMSAVF"; the DSP (V12), which is a member added according to a demand so as to accelerate a data processing rate; a large-scale Field Programmable Gate Array (FPGA) or a Complex Programmable Logic Device (CPLD) (V13), which is configured to generate a dedicated hardware circuit or replace some universal hardware circuit so as to assist the CPU or the MCU to work, accelerate a system operating speed and reduce software and hardware overhead; a program storage (V14), which is a hardware carrier configured to store all software for operating generate the "multimedia multi-information file CMSAVF" and required for playing the "multimedia multi-information file CMSAVF"; and a dynamic data storage (V15), which is a data buffer area and a dynamic or temporary data storage space used for storing all softwares in a software operating process, wherein the all softwares are for operating to generate the "multimedia multi-information file CMSAVF" and required for playing the "multimedia multi-information file CMSAVF". The CPU or the MCU (V11), the DSP (V12), the large-scale FPGA or the CPLD (V13), the program storage (V14) and the dynamic data storage (V15) are mutually connected via the various buses (V10). The hardware platform interface bottom plate (V2) is an interface module or a function module of a software and hardware platform and is configured to obtain the "audio/video stream" and "non-audio/video information" and form all signal output and input interface circuits, connectors and working power supplies required by the multi-information modulation unit of the "multimedia multi-information file CMSAVF" which seemingly still is the audio/video file in the previous format to the universal multimedia player and by the multi-information synchronous reproducing unit (IV) for playing the "multimedia multi-information file CMSAVF". The hardware platform interface bottom plate (V2) includes: an analog video signal input interface module (V20), which is a hardware interface configured to send analog video data to the core plate (V1); a digital video signal input interface module (V21), which is a software and hardware interface configured to send digital video data to the core plate (V1); an analog audio signal input interface module (V22), which is a hardware interface configured to send an analog audio signal to the core plate (V1); a digital audio signal input interface module (V23), which is a software and hardware interface configured to send digital audio data to the core plate (V1); a non-audio/video information input interface module (V24), which is a software and hardware interface configured to enable the core plate to obtain a non-audio/video signal; a video information output interface (V25), which is an output interface for video information generated when the "multimedia multi-information file CMSAVF" is played; an audio information output interface (V26), which is an output interface for audio information generated when the "multimedia multi-information file CMSAVF" is played; a non-audio/video information output interface (V27), which is an output interface for non-audio/video information generated when the "multimedia multi-information file CMSAVF" is played; a human-computer interface module (V28) such as keyboard and indicator lamp, which is a necessary keyboard, indicator lamp interface and processing module thereof arranged to provide a service for an operator to operate modem to generate the "multimedia multi-information file CMSAVF" and play the "multimedia multi-information file CMSAVF"; an online communication interface module (V29), which is a software and hardware interface configured to connect an apparatus of present disclosure with external other systems or devices; a mass storage (V30), which is external storage hardware added necessarily and configured to store the "multimedia multi-information file" CMSAVF and some software program files and provide a required virtual storage when software operates, wherein the mass storage (V30) comprises at least one of followings: a computer hard disk, a solid state storage, a Universal Serial Bus (USB) disk, a Secure Digital (SD) card or a Trans-Flash (TF) card; and a power adapter (V31), which is configured to provide the whole hardware platform with all electric energies required when the hardware platform operates. The multi-information modulation unit and the multi-information synchronous reproducing unit (IV) are connected with the hardware platform core module (V1) via the hardware platform interface bottom plate (V2). The multi-information modulation unit and the multi-information synchronous reproducing unit, via the hardware platform interface bottom plate and the hardware platform core module, are connected with each other, it is implemented that the multi-information modulation unit combines a plurality of relevant files or a plurality of information streams that have associated information relationship together to form the multimedia multi-information audio/video stream CMSAV and/or the multimedia multi-information file CMSAVF, and when necessary the multi-information synchronous reproducing unit is able to synchronously reproduce partial information or complete information carried by the multimedia multi-information audio/video stream CMSAV and/or the multimedia multi-information file CMSAVF.

According to another aspect of the embodiments of the disclosure, a system for synchronously reproducing multimedia multi-information is further provided. The system includes a video information collecting member of a data collection unit (I), an audio information collecting member of the data collection unit (II), a data storage unit (I), a synchronous reproducing unit (IV), and a system hardware platform (V). The system hardware platform (V) includes a hardware platform core module (V1) and a hardware platform interface bottom plate (V2). The video information collecting member of the data collection unit (I) is a device (I) configured to convert a multi-channel video into single-channel video information. The audio information collecting member of the data collection unit (II) is a device (II) configured to convert multi-channel audio information into single-channel audio information. The data storage unit (III) is a member for compressing various information collected by a collection unit in a driving testing process with real-time non-audio/video test information such as all testee information relevant to a driving test, test scores, tester information and test vehicle information and non-real-time test information together into a "driver testing process multi-information audio/video file DEMSAV". The synchronous reproducing unit (IV) is a member capable of synchronously reproducing and playing back the "driver testing process multi-information audio/video file DEMSAV". The system hardware platform (V) includes all required members which are able to be operated to generate the "driver testing process multi-information audio/video file DEMSAV" and to play the "driver testing process multi-information audio/video file DEMSAV". The system hardware platform (V) here includes a universal PC a central processor of which a CPU is compatible to an x86 series, a tablet computer with a central controller of which an MCU is compatible to an ARM series, a mobile terminal which is commonly seen at present such as intelligent mobile phone, as well as all members and function extension members which are customized and dedicated to operating to generate the "driver testing process multi-information audio/video file DEMSAV" and are required to play the "driver testing process multi-information audio/video file DEMSAV". The members here include hardware devices and software embedded into hardware devices. The system hardware platform includes a hardware platform core module (V1), and a hardware platform interface bottom plate (V2). The hardware platform core module (V1) includes: various buses (V10) on a core module, which are common channels configured to enable a CPU or an MCU or a DSP to be able to obtain data required in an operation and to access all devices connected with the bottom plate; the CPU or the MCU (V11), configured to operate all softwares required for generating the "driver testing process multi-information audio/video file DEMSAV" and playing the "driver testing process multi-information audio/video file DEMSAV"; the DSP (V12), configured to assist the CPU or the MCU to work, accelerate a system operating speed and reduce software and hardware overhead; a large-scale FPGA or a CPLD (V13), configured to generate a dedicated hardware circuit or replace some universal hardware circuits so as to assist the CPU or the MCU to work, accelerate the system operating speed and reduce the software and hardware overhead; a program storage (V14), is a hardware carrier for storing all software which is operated to generate the "driver testing process multi-information audio/video file DEMSAV" and is required to play the "driver testing process multi-information audio/video file DEMSAV"; and a dynamic data storage (V15), configured to provide a data buffer area and a dynamic or temporary data storage space required when operating all software required for generating the "driver testing process multi-information audio/video file DEMSAV" and playing the "driver testing process multi-information audio/video file DEMSAV". The CPU or the MCU (V11), the DSP (V121 the large-scale FPGA or the CPLD (V13), the program storage (V14) and the dynamic data storage (V15) are mutually connected via the various buses (V10). The hardware platform interface bottom plate (V2) is configured to be connected with output and input interfaces of a data collection unit, a data storage unit and a synchronous reproducing unit. The hardware platform interface bottom plate (V2) includes: an 8-36V input DC-DC power supply (V20), which provides whole hardware platform with all electric energies required when the hardware platform operates; an analog video camera interface module (V21), which is a hardware interface for sending video data of analog video cameras to a core plate (V1) and through which a total number of the analog video cameras allowed to be accessed is m; a digital video camera interface module (V22), which is a software and hardware interface for sending video data of digital video cameras to the core plate (V1) and through which a total number of the digital video cameras allowed to be accessed is k; an audio pickup interface module (V23), which is a hardware interface for sending analog audio signals output by pickups to the core plate (V1) and through which a total number of the pickups allowed to be accessed is n; a video information output module (V24), which is a hardware interface for converting CVS into analog signals and then outputting to outside, i.e., a hardware interface, for outputting the analog video signals to outside, of an analog video monitor (I6); an audio information output module (V25), which is a hardware interface, of an analog audio monitor (II41) from an analog audio distributor (II3) and for providing analog audio monitoring signals to the outside, for outputting audio signals to the outside; a non-real-time information input interface (V26), which is a software and hardware interface for enabling the core plate to obtain non-real-time signals; a real-time non-audio/video information input interface (V27), which is a software and hardware interface for enabling the core plate to obtain real-time non-audio/video signals; a keyboard and indicator lamp interface (V28), which is a man-machine interface for associating an operator with the core plate; an online communication interface module (V29), which is a software and hardware interface for connecting a system of present disclosure with external other systems or devices; and a mass storage (V30), which is external storage hardware added necessarily to store the "driver testing process multi-information audio/video file DEMSAV", including at least one of followings: a computer hard disk, a solid state storage, a USB disk, an SD card or a TF card.

By employing the disclosure, the following can be achieved: ① as multimedia multi-information files are stored to a same file simultaneously in real time, it may be ensured that the high synchronization can be guaranteed in query and playback and the non-real-time problem that an event and a phenomenon occurred at the same moment cannot be reproduced and played back at the same moment is avoided; ② the plurality of the relevant files which store the multimedia multi-information are combined together appropriately in the quantity, and the occupied amount of the storage space can be reduced; ③ the related multimedia multi-information file storing method is optimized, and while the storage space is reduced, the information falsifying difficulty is also improved; ④ the convenience and the speed for querying the multimedia multi-information are improved and the time waste is reduced; and ⑤ the security and the confidentiality of the multimedia multi-information are improved, so that the multimedia multi-information files are not easily leaked, falsified and deleted in circulation, reproduction and lookup.

For example, in an application scene for processing the driving test information, by employing the disclosure, the following can be achieved: ① the convenience and the speed for querying the testee information are improved and the time waste is reduced; ② the plurality of the relevant files which store the testee information are combined together appropriately in the quantity and even one testee may store all information with merely needing to use one file, and the occupied amount of the storage space can be reduced; ③ the traditional file storing method is optimized, and while the storage space is reduced, the information falsifying difficulty is also improved, such that the impartiality and the fairness of the testing process as well as the authenticity of the information data and the like are guaranteed better, and ④ as the testee information is stored to the same file simultaneously in the testing process in real time, it may be ensured that the high synchronization can be guaranteed in the query and the playback, and the non-real-time problem that the event and the phenomenon occurred at the same moment cannot be reproduced and played back at the same moment is avoided.

BRIEF DESCRIPTION OF THE DRAWINGS

The accompanying drawings are described here to provide a further understanding of the disclosure, and form a part of the disclosure. The schematic embodiments and description of the disclosure are adopted to explain the disclosure, and do not form improper limits to the disclosure. In the drawings:

FIG. 3-1 to FIG. 3-2 are a structure diagram of a "multi-information modulation unit" of a system for synchronously reproducing multimedia multi-information in the disclosure.

FIG. 3-1 is a structure diagram of a "multi-information modulation unit A" of a system for synchronously reproducing multimedia multi-information in the disclosure.

FIG. 3-2 is a structure diagram of a "multi-information modulation unit B" of a system for synchronously reproducing multimedia multi-information in the disclosure.

FIG. 3-3 to FIG. 3-8 are schematic diagrams for several specific methods which are adopted when a "multi-information modulation unit" of a system for synchronously reproducing multimedia multi-information in the disclosure is used for synchronously recording multi-information.

FIG. 3-3 is a state schematic diagram that an "additional information block" formed by "non-audio/video information" is inserted into adjacent two frames of video streams in a form of taking an "additional information frame" created between the adjacent two frames of the video streams as a carrier.

FIG. 3-4 is a state schematic diagram that an "additional information block" formed by "non-audio/video information" is inserted into adjacent two frames of audio streams in a form of taking an "additional information frame" created between the adjacent two frames of the audio streams as a carrier.

FIG. 3-5 is a state schematic diagram of "non-audio/video information" that is taken as an "additional information block" to be embedded into some video frames of a "video stream".

FIG. 3-6 is a state schematic diagram of "non-audio/video information" that is taken as an "additional information block" to be embedded into some audio frames of an "audio stream".

FIG. 3-7 is a state schematic diagram of "non-audio/video information" that is not only taken as an "additional information block" to be embedded into some video frames of a "video stream", but also taken as an "additional information frame" to be inserted between adjacent two frames of video streams of the "video stream".

FIG. 3-8 is a state schematic diagram of "non-audio/video information" that is not only taken as an "additional information block" to be embedded into some audio frames of an "audio stream", but also taken as an "additional information frame" to be inserted between adjacent two frames of audio streams of the "audio stream".

FIG. 4 is a structure diagram of a multi-information synchronous reproducing unit of a system for synchronously reproducing multimedia multi-information in the disclosure.

FIG. 5 is a structure diagram of a hardware platform of a system for synchronously reproducing multimedia multi-information in the disclosure.

FIG. 6-1 is a basic structure diagram of a video information collecting member of a data collection unit I of a system in the disclosure.

FIG. 6-2 is a systematic diagram for an extended structure of the video information collecting member of the data collection unit I of the system in the disclosure in FIG. 6-1.

FIG. 7 is a structure diagram of an audio information collecting member of a data collection unit II of a system in the disclosure.

FIG. 8 is a basic structure diagram of a data storage unit of a system in the disclosure.

In FIG. 1 to FIG. 5:

I—a structure of a video information collecting member of a data collection unit;

II—an audio information collecting member of a data collection unit;

IIIA—a multi-information modulation unit A, IIIB—a multi-information modulation unit 13B;

IV—a multi-information synchronous reproducing unit;

V—a system hardware platform;

I11, I12 . . . I1$h$—analog video cameras, configured to collecting analog video signals, (h=0, 1, 2 . . . 31);

I211, I212 . . . I21$h$—video digital collectors, which are modules for converting the analog video signals into digital video information (h=0, 1, 2 . . . 31);

I221, I222 . . . I22$k$—digital video cameras, (k=0, 1, 2 . . . 31, h+k=, 1, 2 . . . 32), configured to collecting digital video signals;

I3—a video digital mixer, configured to convert the digital video information of h+k input channels into single-channel digital video information CVS to output;

II11, II12 . . . II1$m$—analog audio pickups, configured to collect analog audio information, (m=0, 1, 2 . . . 31);

II2—an analog audio signal mixer, which is an analog signal processing module for mixing n paths of analog audio signals into a single path of the analog audio signals HAS to output;

II30—an audio digital collector, which is a module for converting the analog audio signals into digital audio information;

II31, II32 . . . II3$n$—digital audio pickups, configured to collect the digital audio information, (n=0, 1, 2 . . . 31);

II4—an audio digital mixer, configured to convert the digital audio information of m+n input channels into single-channel digital audio information DAS to output.

Figure 1:
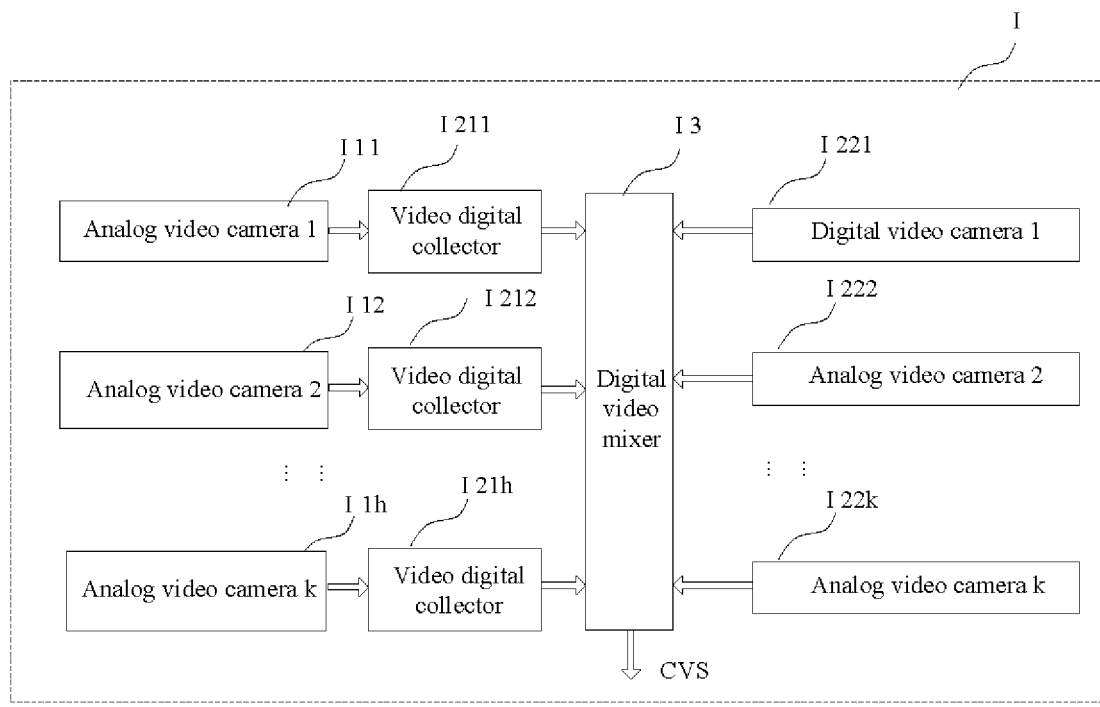
FIG. 1 is a basic structure diagram of a video information collecting member of a data collection unit I of a system for synchronously reproducing multimedia multi-information in the disclosure.
Figure 2:
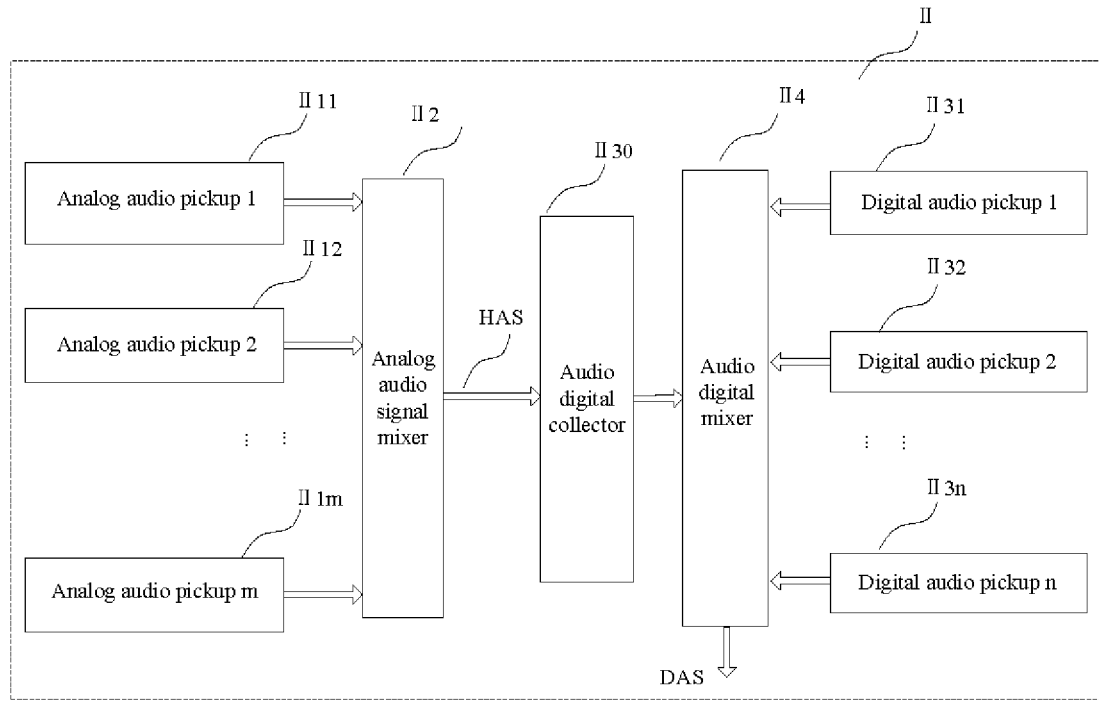
FIG. 2 is a structure diagram of an audio information collecting member of a data collection unit II of a system for synchronously reproducing multimedia multi-information in the disclosure.
Figures 1, 3:
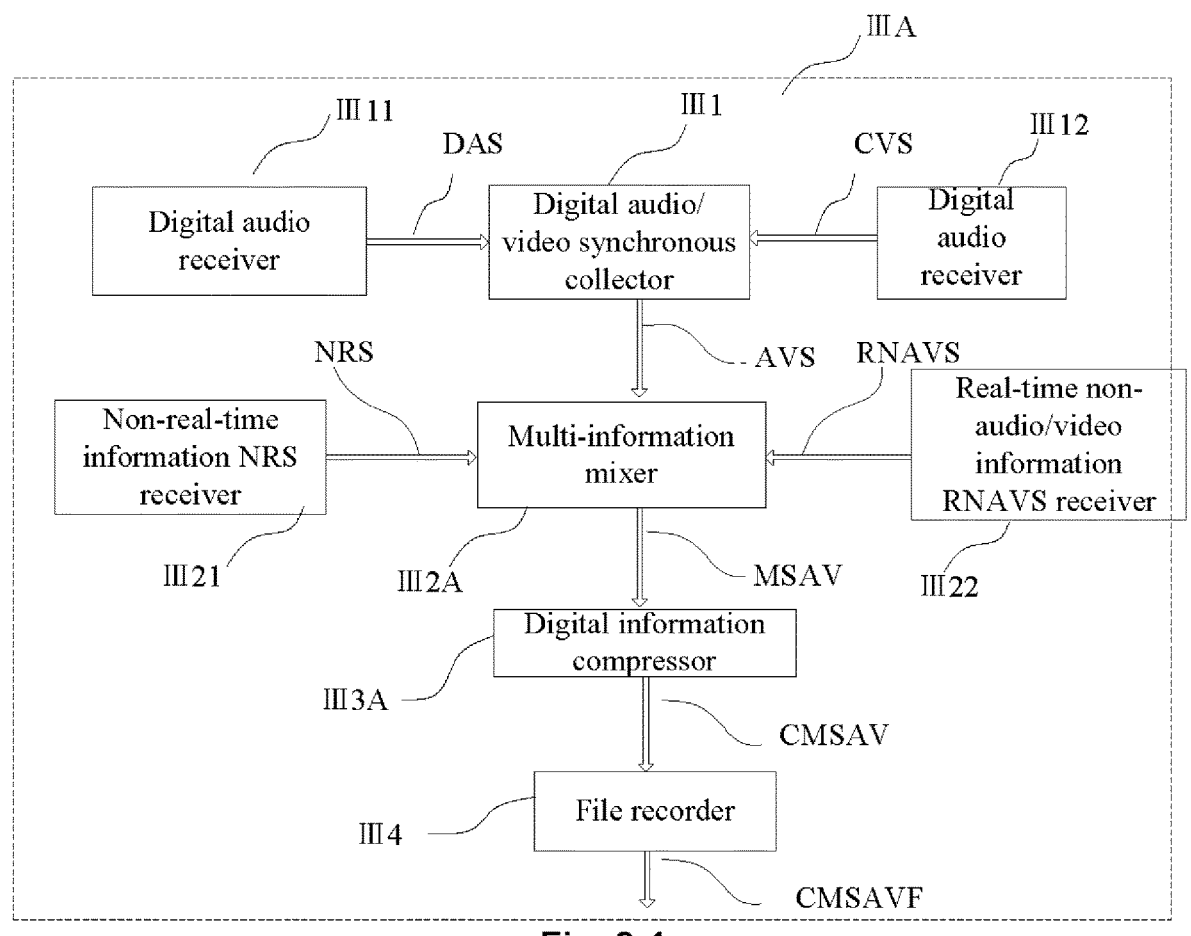
Figures 2, 3:
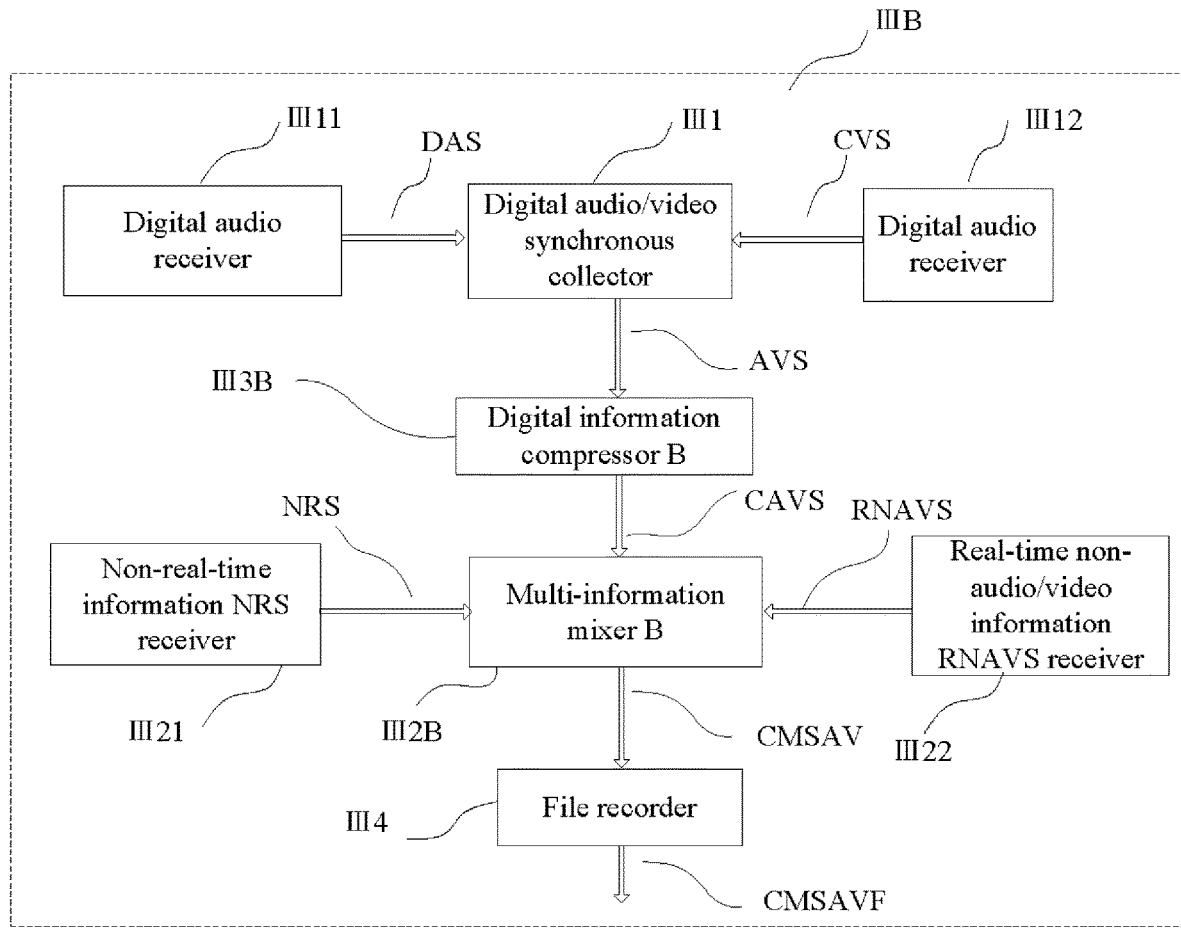
Figure 3:
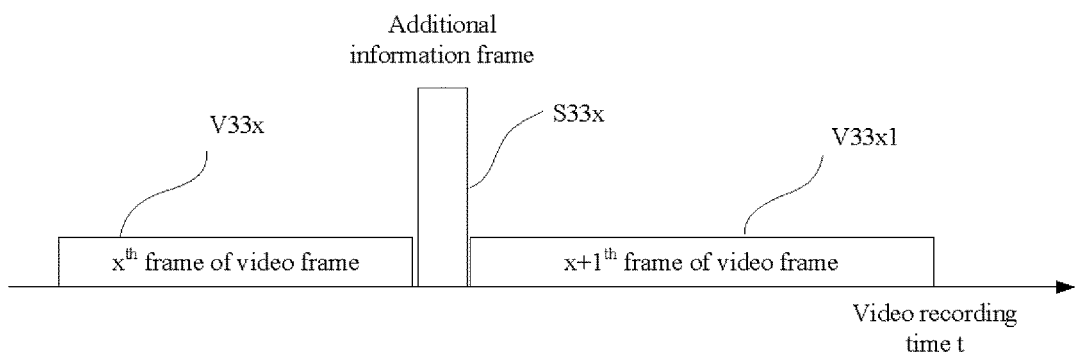

In FIG. 3-1 and FIG. 3-2:

II11—a "digital audio receiver", which is a data buffer area configured to receive the digital audio information DAS and provide these information to the outside;

II21—a "digital video receiver", which is a data buffer area configured to receive the digital video information CVS and provide these information to the outside;

III1—a "digital audio/video synchronous collector", configured to synchronously collect the digital audio information DAS from the digital audio receiver and the digital video information CVS from the "digital video receiver" and to form audio/video information streams AVS;

III21—a non-real-time information NRS receiver, which provides a data buffer area for the information to the outside;

III22—a real-time non-audio/video information RNAVS receiver, which provides a data buffer area for the information to the outside;

III2A—a "multi-information mixer A", which is a digital information modulator for embedding the "non-real-time information" NRS and the "real-time non-audio/video information RNAVS" into uncompressed "audio/video information streams AVS", wherein the output signals of the "multi-information mixer A" includes "multi-information audio/video stream MSAV" of the "non-audio/video information" NAVS;

III3A—a "digital information compressor A", which converts the "multi-information audio/video stream MSAV", by means of compression, into the "multi-information audio/video stream CMSAV" that meet the requirements of a certain audio/video compression standard and include the "non-audio/video information" NAVS;

III3B—a "digital information compressor", which converts the "audio/video stream AVS output from the digital audio/video synchronous collector", by means of compression, into compressed audio/video information streams CAVS that meet the requirements of a certain audio/video compression standard;

III2B—a "multi-information mixer B", which a digital information modulator for embedding the "non-real-time information" NRS and the "real-time non-audio/video information RNAVS" into the compressed "audio/video information streams CAVS", wherein the output signals of the "multi-information mixer B" includes "multi-information audio/video stream CMSAV" of the "non-audio/video information" NAVS;

III4—a "file recorder", which is a function module for storing the "multi-information audio/video stream CMSAV" to a readable-writeable electronic file storage in a manner of an electronic document.

In FIG. 3-3 to FIG. 3-8:

V33$x$ and V33$x$1 are all video information sets of some adjacent two frames in the "video stream" which carries the "non-audio/video information" NAVS.

S33$x$ is an "additional information frame" which is inserted between the V33$x$ and V33$x$1 frames, carries a "non-audio/video information block" and is independent of the video frames.

V34$y$ and V34$y$1 are all audio information sets of some adjacent two frames in the "audio stream" which carries the "non-audio/video information" NAVS.

S34$y$ is an "additional information frame" which is inserted between the V34$y$ and V34$y$1 frames, carries a "non-audio/video information block" and is independent of the video frames.

V35 is a video information set of a certain frame in the "video stream" which carries an "additional information block a".

V36 is an audio information set of a certain frame in the "audio stream" which carries an "additional information block b".

V37$x$ and V37$x$1 are all video information sets of some two frames in the "video stream" which carries the "non-audio/video information" NAVS.

S37$x$ is an "additional information frame" which is inserted between the two frames, carries a "non-audio/video information block" and is independent of the video frames.

V38$y$ and V38$y$1 are all audio information sets of some two frames in the "audio stream" which carries the "non-audio/video information" NAVS.

S38$y$ is an "additional information frame" which is inserted between the two frames, carries a "non-audio/video information block" and is independent of the video frames.

Figures 3, 4:
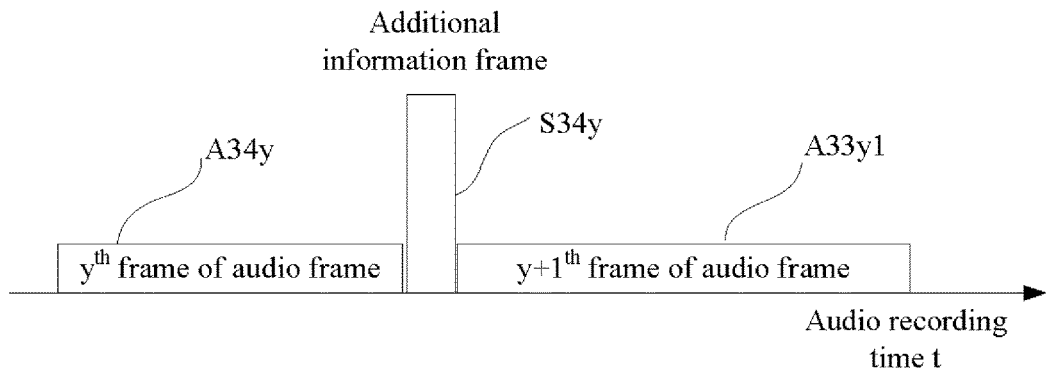

In FIG. 4:

IV1—a "file storage", which is a carrier for storing the electronic file and on which the "multi-information audio/video stream CMSAV" file "CMSAVF" stored in the manner of the electronic document in the disclosure is stored;

IV2—a "multi-information file modulator", which is a software and hardware module for respectively separating and extracting recorded audio/video frame and additional information block out from the multimedia multi-information file CMSAVF;

IV31—an "additional information block", which is a software and hardware module for storing a software data storage buffer area of the "additional information block" demodulated from the multimedia multi-information file CMSAVF;

IV32—an "audio/video frame", which is a buffer area for storing the "audio/video information" demodulated by the "multi-information file modulator" from the multimedia multi-information file CMSAVF;

IV41—a "non-audio/video information modulator", which is a software and hardware module for decompressing, decrypting and restoring the "non-audio/video information" carried by the "additional information block" separated out from the added multimedia multi-information file CMSAVF into original information before being modulated to enter the "additional information block" as required;

IV42—an "audio/video decoder", which is a software and hardware module for decompressing, decrypting and decoding the "audio/video information" stored in the "audio/video frame" according to the requirements of the "audio/video information";

IV411—a "non-real-time display window", which is a mirror image buffer area member of a display screen for displaying the "non-real-time information" NRS separated out from the non-audio/video information modulator and/or an external display device or a part of the display screen in the display device;

IV412—a "real-time non-audio/video information synchronous display window", which is a mirror image buffer area of a display screen for displaying the "real-time non-audio/video information RNAVS" separated out from the non-audio/video information modulator and/or an external display device or a part of the display screen in the display device;

IV421—a video monitor, which is a mirror image buffer area member of a display screen for displaying original video information obtained from the audio/video decoder and/or an external video monitor device or a part of some window on the display screen of the video monitor device;

IV422—an audio loudspeaker, which is an external audio amplification device and horn system for playing original audio information obtained from the audio/video decoder.

Figures 3, 4, 5:
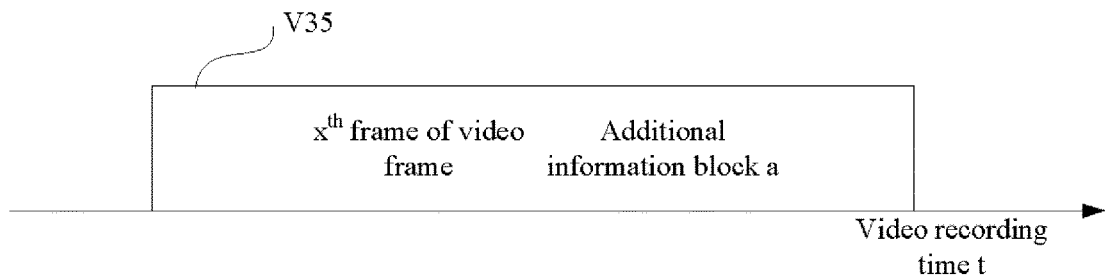

In FIG. 5:

V1—a hardware platform core module, represented by a dashed box in the figure;

V10—various buses on the hardware platform core module;

V11—a CPU or an MCU;

V12—a DSP;

V13—an FPOA or a CPLD;

V14—a program storage;

V15—a data storage;

V2—a hardware platform interface bottom plate;

V20—an analog video signal input interface module: a software and hardware interface configured to send analog video data to the core plate, wherein the total number of analog video data channels allowed to be accessed is h;

V21—a digital video signal input interface module: a software and hardware interface configured to send digital video data to the core plate, wherein the total number of digital cameras allowed to be accessed is k;

V22—an analog audio signal input interface module: a software and hardware interface configured to send analog audio signals to the core plate, wherein the total number of analog audio signal pickups allowed to be accessed is m;

V23—a digital audio signal input interface module: a software and hardware interface configured to send digital audio data to the core plate, wherein the total number of digital audio signal pickups allowed to be accessed is n;

V24—a non-audio/video information input interface module: a software and hardware interface for enabling the core plate to obtain a non-audio/video signal;

V25—a video information output interface module: an output interface for video information generated when the "multimedia multi-information file CMSAVF" is played;

V26—an audio information output interface module: an output interface for audio information generated when the "multimedia multi-information file CMSAVF" is played;

V27—a non-audio/video information output interface: an output interface for non-audio/video information generated when the "multimedia multi-information file CMSAVF" is played;

V28—a human-computer interface such as keyboard and indicator lamp: a necessary keyboard, indicator lamp interface and processing module thereof arranged to provide a service for an operator to operate the modem to generate the "multimedia multi-information file CMSAVF" and play the "multimedia multi-information file CMSAVF";

V29—an online communication interface module: a software and hardware interface configured to connect an apparatus of the present disclosure with external other systems or devices;

V30—a mass storage: external storage hardware added necessarily and configured to store the "multimedia multi-information file" CMSAVF and some software program files and provide a required virtual storage when software operates, including but not limited to one or more combinations of a computer hard disk, a solid state storage, a USB disk, an SD card or a TF card;

V31—a power adapter (V31): configured to provide the whole hardware platform with all electric energies required when it operates.

In FIG. 6 to FIG. 11:

I—a video information collecting member of a data collection unit;

II—an audio information collecting member of a data collection unit;

III—a data store unit;

IV—a synchronous reproducing unit;

V—a system hardware platform;

I1, I2 . . . I1m—analog video cameras;

I211, I212 . . . I21m—"video digital collectors", (m=0, 1, 2 . . . 8);

I221, I222 . . . I22k-digital video cameras, (k=0, 1, 2 . . . 8, m+k=0, 1, 2 . . . 8);

I3—a video digital mixer, configured to convert the digital video information of m+k input channels into single-channel digital video information CVS to output;

I4—a "digital video distributor", which is not a member that must be used in a "video preprocessing method", but a redundancy function provided for a user who needs to simultaneously obtain an analog video and a digital video after being mixed;

I51—a protocol interface which provides the outside with the single-channel digital video information CVS converted by the "video digital mixers" from the m+k channels of the digital video information, and in other words, also may be a "digital video sender" providing the CVS for the outside;

I52—a "video decoder", which is added for the sake of obtaining the analog video that is digitally mixed and restores the digital video into the analog video;

I6—an "analog video monitor" protocol interface, which is an interface member for providing a household television or similar other video display devices that may be used and are provided with a video input interface with a video monitoring signal;

II11, II12 . . . II1n (n=0, 1, 2 . . . 6)-pickups, configured to collect analog audio information in a driver testing process;

II2—an analog audio mixer, configured to mix n channel pickup signals monitored in the driver testing process into single-channel mixed audio information HAS which merely needs to be sent and processed by a single channel;

II3—an "analog audio distributor", which is a front device of an "analog audio monitor" so as to meet the demand;

II41—an analog audio monitor, which is a redundant interface circuit added for monitoring the analog audio information after being mixed;

II42—an "audio digital collector", which is a module for converting analog audio information into digital audio information and is a necessary software, hardware or their mixed device that provides digitalized audio information for the rear "audio information digital processing" process;

II5—a "digital audio sender" which is able to provide the digitalized digital audio information DHAS for the "outside" or a "third party" to use and also pertains to a digital audio information protocol interface;

III1—an audio/video mixing compressor, which is a signal processor configured to mix DHAS audio and video information together so as to form a CAVS information stream that is able to be used conveniently, is used according to the need for an intended use and includes the audio/video information;

III21—a "digital audio receiver", which is an electronic information interface for receiving the digital audio information and through which the digital audio information transmitted to the interface may be obtained;

III22—a "digital video receiver", which is an electronic information interface for receiving the digital video information and through which the digital video information transmitted to the interface is able to be obtained;

III23—non-real-time information, which refers to information irrelevant to a time course of the testing process; according to the standard testing judgment requirements of Ministry of Public Security, it is considered that the existing non-real-time test information in the description includes but not limited to testee information, test car information, tester information, test scores and the like, and the types of these non-real-time test information will be changed along with the ministry standard;

II24—real-time non-audio/video information: according to the standard testing judgment requirements of Ministry of Public Security, it is considered that the existing real-time non-audio/video test information in the description includes but not limited to a position coordinate value of the test car, a travelling track, represented by the position coordinate value, of the test car, a position of the test car when a score deduction point occurs according to the testing judgment standard, and a signal for constraining the test scores on the test car, and the types of these real-time non-audio/video test information will be changed along with the ministry standard;

II3—a "multi-information mixer", which belongs to a digital information processor and is configured to embed the "non-real-time information" III23 and the "real-time non-audio/video information" III24 simultaneously in real time into the information stream CAVS that is processed by the "audio/video mixing compressor" III1 and includes the audio and video information from the "digital audio receiver III21" and the "digital video receiver III22", thereby finally forming a data information stream DEMSAV that merely has single channel, has been encrypted and includes all information of the driving testing process;

III4—a multi-information file recorder, which is a carrier for storing a "driver testing process multi-information audio/video file DEMSAV", refers to an electronic information recording device which has software and/or hardware having a function for implementing recording on an electronic file in the form of any one of electricity, magnetism and light or any combination, and is configured to record the DEMSAV file of the data information stream that is formed by the "multi-information mixer III3", merely has single channels, has been encrypted and includes the all information of the driving testing process in the form of the electronic file; through the III4, the DEMSAV file can be conveniently used for storing, querying, coping, spreading and communicating;

IV0—a "multi-information file storage", which is a carrier for storing the "driver testing process multi-information audio/video file DEMSAV";

IV1—a "driver testing process multi-information audio/video file DEMSAV decoder", which is a member for respectively separating and extracting recorded audio/video information, real-time non-audio/video information and non-real-time information of the driver testing process out from the DEMSAV file;

IV21—a "non-real-time information decoder", which is a member for decompressing and decrypting the "non-real-time information" separated out from the "driver testing process multi-information audio/video file DEMSAV" according to the requirements of the "non-real-time information";

IV211—a "non-real-time information forming" member, which is a member for sending the information obtained from the "non-real-time information decoder" IV21 to a display window buffer area according to the requirements of a man-machine interface;

IV212—a "non-real-time information display window", which is a display buffer area of a man-machine interface window for displaying the non-real-time information;

IV22—a "real-time non-audio/video decoder", which is a member for decompressing and decrypting the "real-time non-audio/video information" separated out from the "driver testing process multi-information audio/video file DEMSAV" according to the requirements of the "real-time non-audio/video information";

IV221—a "real-time non-audio/video information forming" member, which is a member for sending the information obtained from the "real-time non-audio/video information decoder" IV22 to the display window buffer area according to the requirements of the man-machine interface;

IV222—a "real-time non-audio/video information display window", which is a display buffer area of a man-machine interface window for displaying the real-time non-audio/video information;

IV23—an "audio/video decoder", which is a member for decompressing and decrypting the "audio/video information" separated out from the "driver testing process multi-information audio/video file DEMSAV" according to the requirements of the "audio/video information";

IV2311—a "video player" member, which is a member for sending video information obtained from the "audio/video information decoder" IV23 to the display window buffer area according to the requirements of the man-machine interface;

IV2312—a "video monitor window", which is a display buffer area for displaying a man-machine interface window of the video information;

IV2321—an "audio player" member, which is a member for sending audio information obtained from the "audio/video information decoder" IV23 to a digital audio buffer area according to the requirements of the man-machine interface;

IV2322—an "audio loudspeaker", which is a member for converting digital audio data of the digital audio buffer area into analog audio data and sending to an analog audio output interface.

V1—a hardware platform core module, represented by a dashed box in the Fig.;

V10—various buses on the hardware platform core module;

V11—a CPU or an MCU;

V12—a DSP;

V13—a large-scale FPGA or a CPLD;

V14—a program storage;

V15—a data storage;

V2—a hardware platform interface bottom plate;

V20—a DC-DC power supply having an 8-36V input;

V21—an m-path analog video camera interface module which is able to convert the analog video information into the digital video information;

V22—a k-path digital video camera interface module which connects those having a digital video information output;

V23—an n-path audio pickup interface module which is able to convert the analog audio information into the digital audio information;

V24—a video information output module connected to the monitor, or a hardware interface, or a software interface;

V25—an audio information output module connected to the loudspeaker, or a hardware interface, or a software interface;

V26—a non-real-time information input interface, or a hardware interface, or a software interface;

V27—a real-time non-audio/video information input interface, or a hardware interface, or a software interface;

V28—a keyboard and indicator lamp interface in the man-machine interface, or a hardware interface, or a software interface;

V29—an online communication interface, or a hardware interface, or a software interface, or an interface simultaneously including hardware and software;

V30—a high-capacity data storage, including but not limited to various disks, a solid state storage, a storage array and a cloud storage commonly used at present.

The definitions of abbreviations in the description are as follows:

CVS—a single-channel digital video information stream;

HAS—a single-channel analog audio information stream;

DAS (DHAS)—a single-channel digital audio information stream;

AVS—an uncompressed original digital audio/video mixed information stream;

MSAV—a multi-information audio/video stream formed after the non-audio/video information is added to the AVS;

CAVS—a compressed digital audio/video mixed information stream;

CMSAV—a multimedia multi-information audio/video stream, single-channel multi-information audio/video stream data that have been compressed and includes the non-audio/video information, and a data information stream that has been encrypted and includes all information;

CMSAVF—a multimedia multi-information file, a file that is stored to or read out from a file recorder and that stores the multimedia multi-information audio/video stream CMSAV;

NAVS—collectively referred to the non-audio/video information;

RNAVS—collectively referred to the real-time non-audio/video information; NRS-collectively referred to the non-real-time information;

DEMSAV—driver testing process multi-information audio/video data, also a single-channel data information stream that has been encrypted and includes all information of a driving testing process.

DETAILED DESCRIPTION OF THE EMBODIMENTS

To make a person skilled in the art to better understand the solutions of the disclosure, the technical solutions in the embodiments of the disclosure will be clearly and comprehensively described below in combination with the accompanying drawings. Obviously, the embodiments described are merely part of the embodiments of the disclosure but are not all of the embodiments. All other embodiments obtained by those skilled in the art based on the embodiments in the disclosure without creative efforts are within the scope of the protection of the disclosure.

It is to be noted that the terms "first", "second" and the like in the description, the claims and the above accompanying drawings, if any, may be used for distinguishing between similar elements and not necessarily for describing a particular sequential or chronological order. It is to be understood that the terms so used are interchangeable under appropriate circumstances such that the embodiments of the disclosure described herein are capable of operation in sequences other than those illustrated or otherwise described herein. Furthermore, the terms "comprise", "include," "have" and any variations thereof, are intended to cover non-exclusive inclusions, such that a process, method, article, or apparatus that comprises a series of steps or elements is not necessarily limited to those steps or elements, but may include other steps or elements not expressly listed or inherent to such process, method, article, or apparatus.

Embodiment 1

According to the embodiments of the disclosure, the embodiment of a method for synchronously reproducing multimedia multi-information is provided. It is to be noted that the steps shown in the flowchart of the accompanying drawings may be executed such as in a computer system having a group of computer executable instructions. Furthermore, through a logic sequence is shown in the flowchart, in some cases, the steps shown or described may be executed in a sequence other than here.

The method is a method of combining a plurality of relevant files or a plurality of information streams using a "multi-information modulation unit", wherein the plurality of relevant files have an associated information relationship, and the plurality of information streams have an associated information relationship, and then synchronously reproducing the relevant files or the information streams using a dedicated player capable of synchronously reproducing and playing back the multi-information. The method includes the following basic steps.

A, a step of synchronously recording the multi-information: the step is to insert "non-audio/video information" into an "audio/video steam before compression" or an "audio/video steam after compression or a file thereof" using a "multi-information mixer" of the "multi-information modulation unit", that is, to embed some "additional information blocks" carrying the "non-audio/video information" into necessary "video frames" or "audio frames" in the "audio/video steam before compression" or the "audio/video steam after compression or the file thereof", and/or, to create or insert some "additional information frames" carrying the "non-audio/video information" between the necessary "video frames" and "audio frames", thereby finally forming a new audio/video stream CMSAV or file CMSAVF thereof that meets the requirements of a certain compression standard; and B, a step of synchronously reproducing the multi-information: the step is to, after enabling the "multimedia multi-information file CMSAVF", which carries the "non-audio/video information" and seemingly still is an audio and a video meeting the requirements of the certain compression standard, to pass through a "multi-information file demodulator" using a "multi-information synchronous reproducing unit" that is a "multimedia multi-information demodulation unit", respectively obtain three information sets, namely the "additional information blocks", the "video frames" and the "audio frames", and then send the "video frames" and the "audio frames" taken as basic units of "multimedia stream information" to an "audio/video decoder or player" to restore audio/video information and scenes before being recorded, and perform corresponding "demodulation" or called as "decoding" processing on the "additional information blocks" obtained by demodulation from the "multimedia multi-information file CMSAVF" again to restore the "non-audio/video information" embedded into the "multimedia multi-information file CMSAVF".

In the A, the step of synchronously recording the multi-information, first, the "audio/video information" is collected digitally, synchronously and respectively to obtain an information stream, which is not compressed, of an original digital audio/video mixed information stream AVS; and then, according to different synchronization time differences, either the following A1 or A2 is adopted or the following two methods are adopted simultaneously.

Basic method 1: a method highly demanding on the synchronization time difference (the synchronization time difference is required to be relatively small), i.e., the A1 method: first, the "non-audio/video information" is inserted into the synchronously collected digital "audio/video information AVS" using the "multi-information mixer" to form the information stream of the multi-information audio/video stream MAVS formed after the non-audio/video information is added to the AVS; and then, the information stream is sent to a "digital information compressor" for compression, thereby finally forming the audio/video information stream CMSAV or the file CMSAVF thereof stored in a "file recorder", wherein the audio/video information stream CMSAV is able to meet the requirements of some audio/video compression standard, carries the non-audio/video information and appears in a compressed form.

The key point of the method is to insert the "additional information blocks" into an audio stream or a video stream which is just synchronously collected and is not compressed and then perform the compression processing to form the CMSAV stream. The specific steps (referring to FIG. 3-1) are as follows: the audio stream information DAS from a "digital audio receiver II1" and the digital video stream information CVS from a "digital video receiver III2" are collected using a "digital audio/video synchronous collector III1" and are formed into "digital audio/video stream" AVS information; the AVS information, before being compressed, is directly sent to a "multi-information mixer AIII2A", such that the "real-time non-audio/video information RNAVS" embedded here is able to be embedded into the corresponding AVS in a first time. With regard to the "non-real-time information" NRS, there is no strict requirement on the real-time capability, but the "multi-information mixer AIII2A" when receiving corresponding requests still embeds it into the AVS immediately at the time generated by the corresponding requests. The "multi-information audio/video stream MSAV" obtained by means of the above processing passes through a "digital information compressor III3A" again, such that the "multi-information audio/video stream" CMSAV which is compressed and through which the transmission bandwidth and the storage space may be saved is formed finally; and at last, the CMSAV is converted by the file recorder into the electronic digital file CMSAVF to store so as to communicate, duplicate and archive conveniently.

Basic method 2: a method undemanding on the synchronization time difference, i.e., A2 method: first, the synchronously collected digital "audio/video information" AVS is sent to the "digital information compressor" for compression to form the compressed information stream of the audio/video mixed information stream CAVS; and then, the "non-audio/video information" is inserted using the "multi-information mixer", thereby finally forming the audio/video information stream CMSAV or the file CMSAVF thereof stored in the "file recorder", wherein the audio/video information stream CMSAV is able to meet the requirements of some audio/video compression standard, carries the non-audio/video information and appears in a compressed form.

The flowchart of the method is as shown in FIG. 3-2, and the key point is to insert the "additional information blocks" into an audio stream and/or a video stream that has been compressed and then form the CMSAV stream directly using the "multi-information mixer". The specific steps are as follows: the audio stream information DAS from the "digital audio receiver III11" and the digital video stream information CVS from the "digital video receiver III12" are collected using the "digital audio/video synchronous collector III1" and are formed into the "digital audio/video stream" AVS information; and then, the AVS information is directly sent to a "digital information compressor III3B" for compression and therefore the CAVS information stream is obtained. The CAVS here also may directly be the compressed audio/video information output by existing devices such as network camera, video server and the like except for the software and hardware modules on a present market, and these CAVS information passes through a "multi-information mixer III2B" such that when necessary, the "real-time non/audio/video information" RNAVS from the III22 and the "non-real-time information" NRS from the III21 is able to be embedded to obtain the "multi-information audio/video stream" CMSAV; and at last, the CMSAV is converted by the file recorder into the electronic digital file CMSAVF to store so as to communicate, duplicate and archive.

The method here has the advantages that an information source output by an existing external audio/video device that is able to output the compressed audio/video information, such as network camera, video server and the like on the present market, may be used as a carrier of the "additional information blocks", such that the software and hardware resource overhead of the technical device of the disclosure is reduced. In other words, at this moment, the III11, III12, III2B and III2 modules in the FIG. 3-2 may be omitted and therefore the overall cost is saved.

As a transformation of the embodiment of the disclosure, to insert the information undemanding on the synchronization time difference, besides the A2 method, the A1 method may be adopted simultaneously or individually.

In the A, the step of synchronously recording the multi-information, according to different processing methods adopted upon different positions of the "non-audio/video information" where are inserted into the "audio/video information stream", there are the following several different implementation ways.

Example 1: a simple method for synchronously recording multimedia multi-information for single-channel audio/video information:

① when there merely has the "video stream" in the "audio/video stream", the "additional information block" formed by the "non-audio/video information" is inserted in a form of taking an "additional information frame S33$x$" as a carrier, wherein the "additional information frame S33$x$" is created between adjacent two frames of the video stream V33$x$ and V33$x$1 (referring to FIG. 3-3);

② when there merely has the "audio stream" in the "audio/video stream", the "additional information block" formed by the "non-audio/video information" is inserted in a form of taking an "additional information frame S34$y$" as a carrier, wherein the "additional information frame S34$y$" is created between adjacent two frames of the audio stream A34$y$ and A34$y$1 (referring to FIG. 3-4); and ③ when there simultaneously includes the "video" and the "audio" in the "audio/video stream", the "additional information block" formed by the "non-audio/video information" is inserted in a form of taking an "additional information frame" as a carrier, wherein the "additional information frame" is created between adjacent two frames of the video stream or created between adjacent two frames of the audio stream or created between the adjacent two frames of the video stream and simultaneously created between the adjacent two frames of the audio stream.

The above is the most convenient and direct method for synchronously reproducing the multimedia multi-information and is applied to storing single information in various occasions.

Example 2: a safer method for synchronously reproducing multimedia multi-information for single-channel audio/video information:

① when there merely has the "video stream" in the "audio/video stream", the "additional information block a" formed by the "non-audio/video information" is embedded into the "video stream" and into an $x^{th}$ video frame corresponding to a time when the "non-audio/video information" occurs; referring to FIG. 3-5, V35 is a video information set of a certain frame of the "video stream" which carries the "additional information block a";

② when there merely has the "audio stream" in the "audio/video stream", the "additional information block b" formed by the "non-audio/video information" is embedded into the "audio stream" and into a $y^{th}$ audio frame corresponding to a time when the "non-audio/video information" occurs; referring to FIG. 3-6, V36 is an audio information set of a certain frame of the "audio stream" which carries the "additional information block b";

③ when there simultaneously includes a "video stream" and an "audio stream" in the "audio/video stream", the "additional information block a/b" formed by the "non-audio/video information" is inserted into the "video stream"

and into some video frame corresponding to a time when the "non-audio/video information" occurs, or inserted into the "audio stream" and into some audio frame corresponding to a time when the "non-audio/video information" occur, or inserted into the "video stream" and into some video frame corresponding to a time when the "non-audio/video information" occurs and inserted into the "audio stream" and into some audio frame corresponding to a time when the "non-audio/video information" occur (referring to FIG. 3-5, FIG. 3-6); and ④ according to the need, the "additional information blocks a1, a2/b1, b2" formed by the "non-audio/video information" may be individually inserted into a "video stream" formed by an "$X^{th}$ video frame" into which the "additional information block a1" has been embedded and an "$X+1^{th}$ video frame" into which the "additional information block a2" has been embedded, in the form of taking an "additional information frame S37$x$" created between adjacent two frames of the video stream V37$x$ and V37$x$1 as a carrier. Referring to FIG. 3-7, the V37$x$ and the V37$x$1 are all video information sets of some two frames in the "video stream" which carries the "non-audio/video information" NAVS. The S37$x$ is the "additional information frame" which is inserted between adjacent two video frames, carries a "non-audio/video information block" and is independent of the video frames.

Alternatively, the "additional information blocks a1, a2/b1, b2" formed by the "non-audio/video information" is inserted into an "audio stream" formed by "$y^{th}$ audio frame" into which the "additional information block b1" has been embedded and an adjacent audio frame of a "$y+1^{th}$ audio frame" into which the "additional information block b2" has been embedded, in the form of taking an "additional information frame S38$y$" created between adjacent two frames of the audio stream V38$yx$ and V38$y$1. The A38$y$ and A38$y$1 are all audio information sets of some two frames in the "audio stream" which carries the "non-audio/video information" NAVS. The A38$y$ is the "additional information frame" which is inserted between adjacent two audio frames, carries a "non-audio/video information block" and is independent of the video frames.

According to the need, the above two methods may be employed simultaneously, i.e., the "additional information blocks", while being embedded into some video frame of a "video stream", are inserted between adjacent two frames of the "video stream" in the form of taking an "additional information frame" as a carrier, wherein the "additional information frame" is created between the two adjacent frames of the video stream. Furthermore, the "non-audio/video information" is not only taken as the "additional information blocks" to be embedded into some audio frame of an "audio stream", but also inserted between adjacent two frames of the "audio stream" in the form of taking an "additional information frame" created between the two adjacent frames of the audio frame as a carrier (referring to FIG. 3-7 to FIG. 3-8).

The method in the embodiment is applicable to a place where important information is stored, for example, the (3) information to be related at various accident sites mentioned in the background:

3.1 Audio/video information in a site exploration process;

3.2 Site information generated by exploration survey;

3.3 Information of a site handling unit and personnel responsible for site handling at that time; and 3.4 Information of a site handling result.

(4) Various information required to be involved in various real-time monitoring:

4.1 Information such as audio, video, real time, traveling track and relevant scheduling and management generated in daily monitoring and real-time tracking processes of vehicles which carry out a special task such as cash truck and dangerous goods transport vehicle;

4.2 Relevant information needed to strictly control each corresponding stage of product monitoring and inspection processes using means such as sounds and images;

4.3 Various information to be managed in vehicle registration and 4S store service monitoring;

4.4 Relevant information required in a bank service monitoring process;

4.5 Sounds, images, pictures and correspondingly all other documents used as evidences; and 4.6 In measurement, analysis and teaching processes, there often exist some information transferred from audios generated by means of lighting or vibration and factors thereof generating these information, for example, an incandescent lamp will light when there is a certain current, and within a certain current range, the light intensity will be in direct proportion to the current which makes the lamp light.

As one transformation of the method for synchronously reproducing the multimedia multi-information in the first and second examples of the disclosure, when the "non-audio/video information" that needs to be added is associated with the real time when the "non-audio/video information" occurs, the processing method for synchronization of the additional information and the audio/video is as follows: the "additional information" which carries the "non-audio/video information" and the audio/video are created on corresponding positions having a constant time difference range on a same time axis, and in playback, are appropriately reproduced on the same time position (referring to FIG. 3-3 to FIG. 3-8).

As another transformation of the method for synchronously reproducing the multimedia multi-information in the first and second examples of the disclosure, to make sure that all information loaded in the "audio/video information" is able to be secure and reliable, the "non-audio/video information" should be encrypted with a common encryption method before being loaded to the "audio/video information" in the A, the step of synchronously recording the multi-information, and furthermore, the "additional information block" should be further encrypted. That is to say, a changeable "block structure" is adopted, or a method of splitting same "additional information" into a plurality of "video frames" or "audio frames" or "additional information frames" is adopted for encryption.

As a still another transformation of the method for synchronously reproducing the multimedia multi-information in the first and second examples of the disclosure, the function to the "multi-information file demodulator" is limited to merely allow to "read a file". However, the functions of "editing, falsifying and rewriting" the "additional information" obtained when reading the "file" are not provided. An operator in reproduction and playback is able to add the "additional information" secondarily to record the file as required; and if there is a special requirement, a corresponding "file permission" is further allowed to be set to improve the encryption degree.

Example 3: a method for synchronously reproducing multimedia multi-information for a multi-channel audio/video:

When a "media stream" carrying the "non-audio/video information" is multi-channel audio and multi-channel video information, there is a need for the media stream to be able to meet the "synchronization" requirement. The synchronous processing method is to increase an A0: preprocessing step before the A, the step of synchronously reproducing the multi-information, so as to form single-channel audio/video information.

For a multi-channel video, before it is recorded, all video information are synthesized, using a "video digital mixer", into single-channel video information CVS that is a single-channel digital video information stream CVS.

For a multi-channel audio, before it is recorded, all audio information are synthesized, using an "analog audio signal mixer II2", into single-channel analog audio information HAS, and then are changed into single-channel digital audio information DAS that is a single-cannel digital audio information stream DAS with the digital audio information from a "digital audio pickup II3$n$" using a "digital audio mixer II4" after passing through an "audio digital collector II30".

Thereafter, some "non-audio/video information" are embedded into the "audio/video stream" corresponding to the time when these information having an association relationship occur by employing the method in the first embodiment or the method in the second embodiment or by simultaneously adopting the methods in the first and second embodiments, and then are synchronously reproduced using a dedicated player capable of synchronously reproducing and playing back the multi-information.

The increased A0: the preprocessing step is as follows.

In A01, the multi-channel audio information is mixed into the single-channel video information CVS using a video processing unit of a data collection unit (referring to FIG. 1).

The method is to simultaneously collect real-time dynamic video signals of h channels of analog video cameras for monitoring or k channels of digital video cameras for monitoring and perform digital processing, and at last combine into digital video signals CVS for later comprehensive processing or simple storing and recording, wherein the digital video signals CVS are able to meet, merely needing one channel, the requirements of a national standard and the special requirements of a user, the values of the above h and k are as follows: h=0, 1, 2 . . . 31, k=0, 1, 2 . . . 31, and h+k=1, 2, 3 . . . 32.

In A02, the multi-channel audio information is mixed into the single-channel audio information DAS using an audio processing unit of the data collection unit (referring to FIG. 2).

The method is to simultaneously mix, by a circuit, m channels of real-time audio analog signals output by "analog audio pickups" for monitoring or n channels of real-time audio digital signals output by "digital audio pickups" for monitoring into single-channel audio signals DAS to output, wherein the single-channel audio signals DAS is able to meet, merely needing one channel, the requirements of the national standard and the special requirements of the user, and is taken as signal sources needed by an audio digital collector and an analog audio monitor, the values of the above m and n are as follows: m=0, 1, 2 . . . 31, n=0, 1, 2 . . . 31, and m+n=1, 2, 3 . . . 32.

The method here is most applicable for recording the security of driver testing process information and synchronously reproducing of the recorded driver testing process information.

Example 4: an application of a method for synchronously reproducing multimedia multi-information:

When there is no synchronization requirement on the time among the information such as "audio/video stream" and additional "non-audio/video", the method for synchronously reproducing the multimedia multi-information of the disclosure is adopted. Some "additional information" is added to existing "audio/video stream" or files, such that the corresponding "audio/video stream" or files become carriers of the "some additional information". Particularly, with respect to a "video file", when the "video file" merely has "one frame or several frames of videos" or "one picture or several pictures of videos", the file is the one or several photos or pictures as a matter of fact. That is to say, by utilizing the method for synchronously reproducing the multimedia multi-information of the disclosure, the "additional information" can be embedded into the one or several pictures, such that these pictures become the carriers of the "additional information".

Specifically, the application includes that: the method for synchronously reproducing the multimedia multi-information in the first example or second example is applied to website security protection, i.e., by adopting the method for synchronously reproducing the multimedia multi-information in the first example or second example and using "audio, video and picture files" to indicate a website, the information to be transferred by the website all are embedded into the "audio/video information streams" or files of the website, so as to prevent the attack and damage of the current malicious software.

Alternatively, the method for synchronously reproducing the multimedia multi-information in the first example or second example is applied to security protection of information transmission, i.e., by adopting the method for synchronously reproducing the multimedia multi-information in the first example or second example, the information to be confidentially protected all are embedded into some "audio/video information streams" or "audio/video information files or picture/image files" for necessary storage or transmission.

Alternatively, the method for synchronously reproducing the multimedia multi-information in the first example or second example is applied to transmitting some customized information in the digital audio/video broadcasting field; and thus, the transmission links and corresponding devices for the customized information may be saved.

Embodiment 2

According to the embodiments of the disclosure, the embodiment of a method for synchronously reproducing multimedia multi-information is further provided. The method is to respectively convert multi-channel audio information and multi-channel video information, collected concurrently, of a driving test into single-channel audio information HAS and single-channel video information CVS; then store with all non-real-time test information relevant to the driving test, such as testee information, test scores, tester information and test vehicle information to all audio/video monitoring information which carries a testing process of testees and form, in the form of a compressed file, a "driver testing process multi-information audio/video file DEMSAV" which includes various information of the driving testing process; and then synchronously reproduce all information recorded in the "driver testing process multi-information audio/video file DEMSAV" of a multi-information driving test synchronous recording process using a dedicated player capable of synchronously reproducing and playing back the multi-information.

The method mainly includes three steps.

In (1) a step of collecting: the multi-channel audio and multi-channel video are respectively converted into the single-channel audio HAS and the single-channel video CVS.

In (2) a step of storing: the information in the step of collecting is formed into the "driver testing process multi-information audio/video file DEMSAV" which includes the various information of the driving testing process and is stored to a high-capacity data storage.

In (3) a step of synchronously reproducing: the all information recorded in the "driver testing process multi-information audio/video file DEMSAV" of the multi-information driving test synchronous recording process is synchronously reproduced using the dedicated player capable of synchronously reproducing and playing back the multi-information.

According to the method for improving the security of the driving test information and synchronously reproducing the driving test information, the (1) the step of collecting is as follows.

Figures 3, 4, 5, 6:
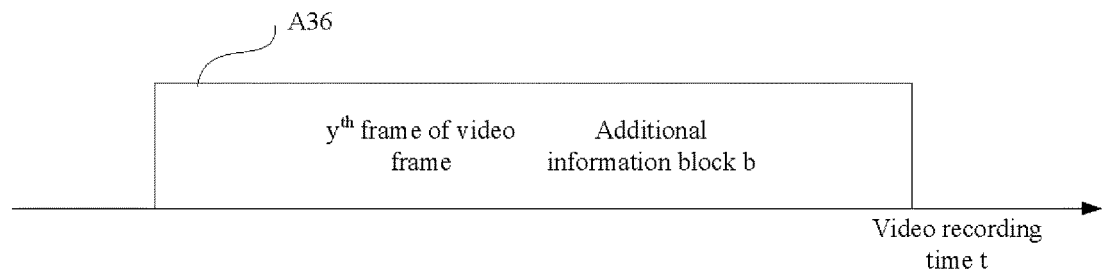

In A, the multi-channel video information, before being stored, is combined into the single-channel video information CVS using a data collection unit (referring to FIG. 6-1).

The method is to simultaneously collect m channels of real-time dynamic video signals of analog video cameras for monitoring a testing process or k channels of digital video cameras for monitoring the testing process and perform digital processing, and at last combine into video signals for later comprehensive processing or simple storing and recording, wherein the combined video signals are able to meet, merely needing one channel, the requirements of a user, the values of the above m and k are as follows: m=0, 1, 2 . . . 8, k=0, 1, 2 . . . 8, and m+k=1, 2, 3 . . . 8.

Figures 3, 4, 5, 6, 7:
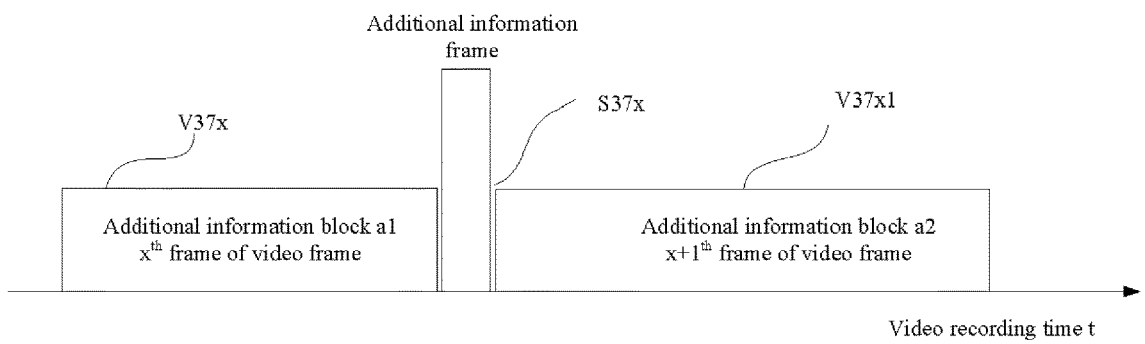

In B, the multi-channel audio information is mixed into the single-channel audio information HAS using a digital analog unit (referring to FIG. 7).

The method is to simultaneously mix n channels of real-time audio signals analog circuit of pickups for monitoring the testing process into single-channel audio signals to output, wherein the single-channel audio signals are able to meet, merely needing one channel, the requirements of the user, and are taken as signal sources for audio digital collection; the values of the n is as follows: n=1, 2 . . . 6.

According to the method for improving the security of the driving test information and synchronously reproducing the driving test information, in the (2) the step of storing, the "driver testing process multi-information audio/video file DEMSAV" which records various information of the driving testing process not only includes the real-time information and the non-real-time information, but also includes the audio/video information and the non-audio/video information; in the process of forming the file DEMSAV, the (2) the step of storing (referring to FIG. 8) is as follows.

In C, the video information CVS and the audio information HAS collected in the step of collecting are digitally compressed first using an audio/video mixer to form audio/video information CAVS which is able to meet the requirements of a certain compression standard, carries all audio/video monitoring information of the testing process of a testee and appears in a compressed form.

In D, the non-real-time test information such as testee information, tester information and test car information except for the test scores is stored to a beginning part of the audio/video information CAVS which carries the all audio/video monitoring information of the testing process of the testee and appears in the compressed form, that is after the testee obtains a test beginning notification and before a formal test beginning process, thereby forming the basic "driver testing process multi-information audio/video file DEMSAV".

In E, the real-time position value that is a "coordinate" value of the test car, and the real-time non-audio/video monitoring information of relevant real-time information that is required to be stored and recorded when a score deduction point in test judgment occurs are synchronously stored to a position, corresponding to a video frame at that moment, in the basic "driver testing process multi-information audio/video file DEMSAV" which records the CAVS information.

In F, after the test is finished, scores of the testee are timely stored to a corresponding video frame in the basic "driver testing process multi-information audio/video file DEMSAV", and enable the scores locating in some video frames after the test is finished and before the video recording is stopped, thereby forming the final "driver testing process multi-information audio/video file DEMSAV".

The playback method for guaranteeing that the driving test information is synchronously reproduced is as follows (referring to FIG. 9).

All information in the testing process of the testee is simultaneously and synchronously recorded in the driver testing process multi-information audio/video file DEMSAV which stores the driving test information. However, in reproduction and playback, to achieve the expected effect of an operator or an inquirer, it is necessary to launch the following one or more work.

In G, in an initial stage of the reproduction and playback process, the non-real-time non-audio/video information such as testee information, tester information and test car information in the "driver testing process multi-information audio/video file DEMSAV" which stores the driving test information is gradually separated out one by one using a "driver testing process multi-information audio/video file DEMSAV decoder IV1" first and is placed into a storage buffer area of the player or is stored to a certain specified file for later use when necessary.

In H, as the reproduction and playback process proceeds to gradually enter an operating process in which the testee starts to test, the non-audio/video information is continuously and synchronously separated out from a video frame being played; and meanwhile, the position coordinate values of the test car are depicted to specified positions using corresponding points of a certain coordinate system, so as to form a travelling track of the test car to be presented to an observer and therefore the operator for the reproduction and playback uses it as needed.

In I, in the process of separating and extracting these information using a non-audio/video information separation module (including software, hardware or a device having both), when the score deduction point for the test judgment occurs, a DEMSAV file reproduction and playback module (including software, hardware or a device having both) is able to be notified immediately, i.e., the service can be paused temporarily.

In J, the module (including software, hardware or a device having both) for the reproduction and playback, when receiving a notification that the score deduction point for the test judgment occurs, is paused automatically and temporarily so as to attract the attention of the observer.

In K, the module (including software, hardware or a device having both) for the reproduction and playback, by means of providing relevant services and functions such as receiving, an operation instruction of the operator for the reproduction and playback in real time, is able to be better meet the requirements of the operator and implements functions and services (such as pause, amplification and duplication) expected by the inquirer, such that a friendly man-machine interface is provided for the operator for the reproduction and playback and the operator for the reproduction and playback can provide a relatively considerate operation service for a query requester.

As a transformation of the embodiment of the disclosure, on the basis of the basic method of the A of the (1), the step of collecting, the multi-channel video information, before being stored, is combined into the single-channel video information CVS using the data collection unit, the following functions further are able to be extended and increased (referring to FIG. 6-2):

① by means of a "digital video distributor" I4, "mixed analog video and digital video" information is provided for a user who needs to simultaneously obtain an analog video and a digital video after being mixed;

② by means of a "digital video senders" I51 protocol interface, the single-channel digital video information CVS converted by a "video digital mixer" I3 from m+k channels of digital video information is provided for the outside;

③ by means of a "video decoder" I52 that is a video decoder" for restoring the digital video into the analog video, the service is provided for the user who needs to obtain the mixed digitally analog audio; and ④ by means of an "analog video monitor" protocol interface I6, video monitoring signals are provided for a household television or similar other video display devices that are provided with a video input interface.

One or more of the above extended functions are selected according to user's needs.

As another transformation of the embodiment of the disclosure, on the basis of the basic method of the B of the (1), the step of collecting, the multi-channel audio information is mixed into the single-channel audio information HAS using the analog audio mixer unit, the following functions further are able to be extended and increased:

① by means of interfaces of an analog audio distributor II3 and an analog audio monitor II41, the analog audio information after being mixed is provided for a user in need of monitoring; and ② by means of an audio digital collector II42, the analog audio information is converted into digital audio information DHAS and then the digitalized digital audio information is provided for the "outside" or a third party using a "digital audio sender" II5 interface for use (referring to FIG. 7).

As a still another transformation of the embodiment of the disclosure, in the method of the (2), the step of storing, according to the user's needs, there has a format that is able to be compatible to a certain present existing multimedia storage file, such that some multimedia player are able to play back an audio/video part therein. The media player here includes but not limited to a RealPlayer, a Windows Media Player, a FLASH, a Storm Player, an mp4 player and an iQIYI or Tencent video player.

In the method of the (2), the step of storing, to guarantee the test information of the testee to be secure and reliable, there is a need to adopt any one or two of the following encryption methods.

① In the step C, the video information CVS and the audio information HAS collected in the step of collecting are digitally compressed first using the audio/video mixer to form the audio/video information CAVS which is able to meet the requirements of a certain compression standard, carries the all audio/video monitoring information of the testing process of the testee and appears in the compressed form. Before the compression processing process, the encryption is performed first, then the non-audio/video information is embedded and at last is sent to a "storing-recording module" or a "file recorder" for storing and recording.

② The test information of the testee is embedded into a storing frame of the compressed audio/video frame timely and appropriately, such that when the DEMSAV file is played using a universal media player, it is very difficult to find that the test information as a video noise is existed in the DEMSAV file even through with a very careful observation; and therefore, the invisibility of an information storing position is guaranteed.

As a still another transformation of the embodiment of the disclosure, in the playback method for guaranteeing that the driving test information is synchronously reproduced, to guarantee the test information of the testee to be secure and reliable and to improve the security in storage and management of the DEMSAV file, there is a need to adopt the following methods.

① To achieve the required information storage and reproduction effect, it is essential to use a dedicated DEMSAV file reproduction and playback software or hardware device in the reproduction and playback so as to realize the complete data information reproduction and synchronization effect.

② The driver testing process multi-information audio/video file DEMSAV dedicated player merely provides functions associated with the reproduction and playback and does not provide an editing function such as falsifying, so that the DEMSAV file becomes a read-only file for the dedicated player and the secondary write-in is not allowed.

③ The driver testing process multi-information audio/video file DEMSAV dedicated player, by virtue of a tracking function, realizes the means of reviewing the permission of a playing operator and recording the information of the operator, prevents an unauthorized person from using freely and frightens an illegal user, and thus, the security of the DEMSAV file in storage and management is increased.

According to the need, any one of the methods is adopted or two or three of the methods are adopted simultaneously.

Embodiment 3

According to the embodiments of the disclosure, the embodiment of a system for synchronously reproducing multimedia multi-information is further provided. The system is a system for implementing the method for synchronously reproducing the multimedia multi-information. The system includes a multi-information modulation unit, a multi-information synchronous reproducing unit that is a multi-information demodulation unit IV and a system hardware platform V. The multi-information modulation unit is a member configured to combine a plurality of relevant information having an associated information relationship together, that is, to insert "non-audio/video information" into an "audio/video steam or a file thereof" to form a "multimedia multi-information audio/video stream CMSAV" or a "multimedia multi-information file CMSAVF" which seemingly still is the audio/video stream or the file thereof in a previous format on a universal multimedia player.

The multi-information synchronous reproducing unit IV is a member configured to synchronously reproduce and play back the "multimedia multi-information file CMSAVF", which carries the "non-audio/video information" and seemingly still is the audio/video file in the previous format to the universal multimedia player, after "multi-information file demodulation".

The system hardware platform V is a software and hardware platform of a modem configured to generate the "multimedia multi-information audio/video stream CMSAV and the multimedia multi-information file CMSAVF thereof" and restore the various information existed in the "multimedia multi-information audio/video stream CMSAV and the multimedia multi-information file CMSAVF thereof". The system hardware platform V includes all software and hardware members that are able to be operated to generate the "multimedia multi-information audio/video stream CMSAV and the multimedia multi-information file CMSAVF thereof" which seemingly still are the audio/video file in the previous format to the universal multimedia player and are required to play the "multimedia multi-information audio/video stream CMSAV and the multimedia multi-information file CMSAVF thereof".

The platform here includes a universal PC computer with a CPU compatible to an x86 series as a central processor, a tablet computer with an MCU compatible to an ARM series as a central controller, a mobile terminal which is commonly seen at present such as intelligent mobile phone, as well as all members and function extension members which are customized and dedicated to operating to generate the "multimedia multi-information audio/video stream CMSAV and the multimedia multi-information file CMSAVF thereof" which seemingly still are the audio/video file in the previous format to the universal multimedia player and are required to play the "multimedia multi-information audio/video stream CMSAV and the multimedia multi-information file CMSAVF thereof". The members here include hardware devices and software embedded into the hardware devices.

As shown in FIG. 5, the system hardware platform includes a hardware platform core module V1, and a hardware platform interface bottom plate V2.

The hardware platform core module V1 is a combination of software and hardware capable of accomplishing data processing, wherein one is a PC computer system with the x86 or compatible CPU thereof as the central processor, and the other one is an embedded platform, a mobile terminal device, a tablet computer, an intelligent television, intelligent mobile phone, and all members and the function extension members, which are with the ARM and compatible MCU thereof as a core, wherein the all members and the function extension members are customized and dedicated to operating to generate the "multimedia multi-information audio/video stream CMSAV and the multimedia multi-information file CMSAVF thereof" which seemingly still are the audio/video file in the previous format to the universal multimedia player and are required to play the "multimedia multi-information audio/video stream CMSAV and the multimedia multi-information file CMSAVF thereof".

The hardware platform interface bottom plate V2 is an interface device which provides various services required by signal input and output as well as networking for the V1. The hardware platform core module V1 includes:

various buses V10 on the core module, which are common channels configured to enable the CPU or the MCU or a DSP to be able to obtain data required in an operation and to access all devices connected with the bottom plate;

the CPU or the MCU V11, which employs an "x86 series or compatible CPU thereof" or an "ARM series or compatible MCU thereof" and is configured to operate the all softwares required for generating the "multimedia multi-information audio/video stream CMSAV and the multimedia multi-information file CMSAVF thereof" and playing the "multimedia multi-information audio/video stream CMSAV and the multimedia multi-information file CMSAVF thereof";

the DSP V12, which is a member added according to a demand so as to accelerate a data processing speed;

an large-scale FPGA or a CPLD V13, which is configured to generate a dedicated hardware circuit or replace some universal hardware circuit so as to assist the CPU or the MCU to work, accelerate the system operating speed and reduce the software and hardware overhead;

a program storage V14, which is a hardware carrier configured to store all software required for operating to generate the "multimedia multi-information audio/video stream CMSAV and the multimedia multi-information file CMSAVF thereof and play the "multimedia multi-information audio/video stream CMSAV and the multimedia multi-information file CMSAVF thereof; and a dynamic data storage V15, which needs to be used in a software operating process and is configured to provide a data buffer area and a dynamic or temporary data storage space required when storing the all software required for operating to generate the "multimedia multi-information audio/video stream CMSAV and the multimedia multi-information file CMSAVF thereof and play the "multimedia multi-information audio/video stream CMSAV and the multimedia multi-information file CMSAVF thereof.

The CPU or the MCU V11, the DSP V12, the large-scale FPGA or the CPLD V13, the program storage V14 and the dynamic data storage V15 are mutually connected via the various buses V10.

The hardware platform interface bottom plate V2 is an interface module or a function module of the software and hardware platform and is configured to obtain the "audio/video stream" and "non-audio/video information" and form all signal output and input interface circuits, connectors and working power supplies required by the multi-information modulation unit of the "multimedia multi-information audio/video stream CMSAV and the multimedia multi-information file CMSAVF thereof which seemingly still are the audio/video file in the previous format to the universal multimedia player, and required by the multi-information synchronous reproducing unit IV for playing the "multimedia multi-information audio/video stream CMSAV and the multimedia multi-information file CMSAVF thereof.

The hardware platform interface bottom plate V2 includes:

an analog video signal input interface module V20, which is a hardware interface configured to send analog video data to the core plate V1;

a digital video signal input interface module V21, which is a software and hardware interface configured to send digital video data to the core plate V1;

an analog audio signal input interface module V22, which is a software and hardware interface configured to send an analog audio signal to the core plate V1;

a digital audio signal input interface module V23, which is a software and hardware interface configured to send digital audio data to the core plate V1;

a non-audio/video information input interface module V24, which is a software and hardware interface configured to enable the core plate to obtain non-audio/video information;

a video information output interface V25, which is an output interface for video information generated when the "multimedia multi-information audio/video stream CMSAV and the multimedia multi-information file CMSAVF thereof" are played;

an audio information output interface V26, which is an output interface for audio information generated when the "multimedia multi-information audio/video stream CMSAV and the multimedia multi-information file CMSAVF thereof" are played;

a non-audio/video information output interface V27, which is an output interface for non-audio/video information generated when the "multimedia multi-information audio/video stream CMSAV and the multimedia multi-information file CMSAVF thereof" are played;

a human-computer interface module V28 such as keyboard and indicator lamp, which is a necessary human-computer interface such as keyboard and indicator lamp and a processing module thereof arranged to provide a service for an operator to operate the modem to generate the "multimedia multi-information audio/video stream CMSAV and the multimedia multi-information file CMSAVF thereof" and play the "multimedia multi-information audio/video stream CMSAV and the multimedia multi-information file CMSAVF thereof";

an online communication interface module V29, which is a software and hardware interface configured to connect an apparatus of the disclosure with external other systems or devices;

a mass storage V30, which is external storage hardware added necessarily and configured to store the "multimedia multi-information file" CMSAVF and some software program files and provide a required virtual storage when software operates, including one or more combinations of a computer hard disk, a solid state storage, a USB disk, an SD card or a TF card;

and a power adapter V31, which is configured to provide the whole hardware platform with all electric energies required when the whole hardware platform operates.

The multi-information modulation unit and the multi-information synchronous reproducing unit IV are connected with the hardware platform core module V1 via the hardware platform interface bottom plate V2, so it is implemented that the "multi-information modulation unit" combines the plurality of the relevant files or the plurality of the information streams that have the associated information relationship together to form the multimedia multi-information audio/video stream CMSAV and/or the multimedia multi-information file CMSAVF, and when necessary partial information or complete information carried by the multimedia multi-information audio/video stream CMSAV and/or the multimedia multi-information file CMSAVF is synchronously reproduced using the dedicated player capable of synchronously reproducing and playing back the multi-information.

According to different structures of the multi-information modulation unit, there are the following two different implementation ways.

Example 1

A system for synchronously reproducing multimedia multi-information for single-channel audio/video information:

according to the system for synchronously reproducing the multimedia multi-information, as mentioned above, the basic structure includes a multi-information modulation unit, a multi-information synchronous reproducing unit that is a multi-information demodulation unit IV, and a system hardware platform V.

As shown in FIG. 3-1, the multi-information modulation unit of the system for synchronously reproducing the multimedia multi-information is a multi-information modulation unit A; the multi-information modulation unit A includes a digital audio/video synchronous collector III1, a multi-information mixer AIII2A, a digital information compressor AIII3A and a multi-information file recorder III4 that are connected consecutively, as well as a digital audio receiver III11 and a digital video receiver III12 simultaneously connected with the digital audio/video synchronous collector III1, and a non-real-time information NRS receiver III21 and a real-time non-audio/video information receiver III22 simultaneously connected with a multi-information mixer AIII2B.

The digital audio receiver III1 is an electronic information interface configured to receive single-channel digital audio information DAS from an audio digital mixer I4; and through the interface, the digital audio information DAS transmitted to the interface may be obtained.

The digital video receiver III12 is an electronic information interface configured to receive single-channel digital video information CVS from a video digital mixer I3; and through the interface, the digital video information CVS transmitted to the interface may be obtained.

The non-real-time information NRS receiver III21 is an electronic information interface configured to receive non-real-time information NRS which needs to be mixed to an audio/video information stream; and through the interface, the non-real-time information NRS transmitted to the interface may be obtained.

The real-time non-audio/video information receiver III22 is an electronic information interface configured to receive real-time non-audio/video information RNRVS which needs to be mixed to the audio/video information stream; and through the interface, the real-time non-audio/video information RNRVS transmitted to the interface may be obtained.

The digital audio/video synchronous collector III1 is a software and hardware signal processing module configured to synchronously collect the digital audio data DAS and the digital video information CVS and enable the audio/video information therein to form an audio/video information stream AVS having a fixed time relationship.

The multi-information mixer AIII2A is a software and hardware processing module capable of mixing graphics, image and text information together, that is an information processing module for inserting the non-real-time information NRS and the real-time non-audio/video information RNRVS of the "non-audio/video information" into the audio/video stream AVS output by the digital audio/video synchronous collector III1 or a file of the audio/video stream AVS, such that an audio/video stream MSAV or a file thereof that seems still in a previous format to a universal multimedia player is formed.

The digital information compressor AIII3A is configured to convert the "multi-information audio/video stream" MSAV which is output by the multi-information mixer AIII2A and carries the "non-audio/video information" into a "multi-information audio/video stream CMSAV" that meets the requirements of a certain audio/video compression standard and includes the "non-audio/video information" NRS and RNAVS.

The multi-information file recorder III4 is a carrier for storing a multimedia multi-information file CMSAVF; refers to an electronic information recording device which has software and/or hardware having a function for implementing recording on an electronic file in the form of any one of electricity, magnetism and light or any combination; and is configured to record, in the form of the electronic file, the multimedia multi-information file CMSAVF of the "multi-information audio/video stream CMSAV", which is formed by the digital information compressor AIII3A, merely has a single channel and includes the "non-audio/video information" NRS and RNAVS.

The non-real-time information NRS refers to non-audio/video information irrelevant to a time course of the carrier which carries the NRS, that is, the information that may be embedded into any position of the carrier without a time difference error.

The real-time non-audio/video information RNRVS refers to non-audio/video information having a fixed time difference relationship with a time course of a carrier which carries the RNRVS.

The multi-information modulation unit A is configured to first insert the "non-audio/video information" into the synchronously collected and digitalized "audio/video information" AVS using the "multi-information mixer AIII2A" to form an information stream, which is formed after the non-audio/video information is added to the AVS, of the multi-information audio/video stream MSAV, and then send to the digital information compressor AIII3A for compression, thereby finally forming the audio/video information stream CMSAV or the multimedia multi-information file CMSAVF thereof stored in the "file recorder", wherein the multi-audio/video information stream CMSAV is able to meet a certain audio/video compression standard, carries the non-audio/video information and appears in the compressed form.

As shown in FIG. 4, the synchronous reproducing unit IV includes a multi-information file storage IV1, a multi-information file demodulator IV2, a non-audio/video information modulator IV41 and an audio/video decoder IV42 that are connected consecutively.

The multi-information file storage IV1 is a carrier for storing the "multimedia multi-information file CMSAVF".

The multi-information file demodulator IV2 is a member for respectively separating and extracting recorded audio/video information that carries all audio/video monitoring information, real-time non-audio/video information and non-real-time information out from the multimedia multi-information file CMSAVF to form an original additional information block IV31 and an audio/video frame IV32 again.

The non-audio/video information modulator IV41 is a member for demodulating the additional information block IV31 separated from the "multimedia multi-information file CMSAV" once again so as to separate out the "real-time non-audio/video information RNAV" and "non-real-time information" NRS.

The "non-real-time information display window IV411" is a mirror image buffer area member of a display screen for displaying the "non-real-time information" NRS separated out from the non-audio/video information modulator IV41, and/or an external display device or a part of the display screen in the display device.

The "real-time non-audio/video information synchronous display window IV412" is a mirror image buffer area of a display screen for displaying the "real-time non-audio/video information RNAVS" separated out from the non-audio/video information modulator IV41, and/or an external display device or a part of the display screen in the display device.

The audio/video decoder IV42 is a member for decompressing and decoding the "audio/video frame" separated out from the "multi-information file modulator" IV2 according to the requirements of the "audio/video stream information" to finally obtain an original audio stream and video stream.

The video monitor IV421 is a mirror image buffer area member of a display screen for displaying original video information obtained from the audio/video decoder IV42, and/or an external video monitor device or a part of a certain window on the display screen of the video monitor device.

The audio loudspeaker IV422 is an external audio amplification device and horn system for playing original audio information obtained from the audio/video decoder IV42.

The multi-information file demodulator IV2 further be compatible to a function of directly demodulating the "multimedia multi-information stream" CMSAV in addition to a function of demodulating the "multimedia multi-in formation file" CMSAVF.

Example 2

A system B for synchronously reproducing multimedia multi-information for single-channel audio/video information:

the basic structure of the system is the same as the first example. The difference lies in that the structure of a multi-information modulation unit is different. The multi-information modulation unit of the system is a multi-information modulation unit B.

As shown in FIG. 3-2, the multi-information modulation unit BIIIB includes a digital audio/video synchronous collector III, a digital information compressor BIII3B, a multi-information mixer BIII2B and a multi-information file recorder III4 that are connected consecutively, as well as a digital audio receiver III11 and a digital video receiver III12 simultaneously connected with the digital audio/video synchronous collector III, and a non-real-time information NRS receiver III21 and a real-time non-audio/video information receiver III22 simultaneously connected with a multi-information mixer BIII2B.

The digital audio receiver III11, the digital video receiver III12, the digital audio/video synchronous collector III, the multi-information file recorder III4, the non-real-time information NRS receiver III21 and the real-time non-audio/video information receiver III22 are the same as corresponding portions of the multi-information modulation unit A in the first example in structure and effect and will not be repeated here.

The digital information compressor BIII3B is a digital information processor module configured to compress an audio/video stream AVS output by the digital audio/video synchronous collector II1 and enable the compressed ANS to form a compressed audio/video information stream CAVS that meets a certain audio/video compression standard.

The multi-information mixer BIII2B is a software and hardware processing module capable of mixing graphics, image and text information together and is configured to insert the non-real-time information NRS and the real-time non-audio/video information RNRVS of the "non-audio/video information" into the audio/video information stream CAVS, compressed by the digital information compressor BIII3B, to form a "multi-information audio/video stream CMSAV" including the "non-audio/video information" RNS and RNAS.

The multi-information modulation unit BIIIB first sends the synchronously collected and digitalized "audio/video stream" AVS to the digital information compressor BIII3B for compression to form a compressed information stream of an audio/video mixed information stream CAVS, and then insert the "non-audio/video information" using the multi-information mixer BIII2B, thereby finally forming an audio/video information stream CMSAV or a multimedia multi-information file CMSAVF thereof stored in the "file recorder", wherein the audio/video information stream CMSAV is able to meet the requirements of a certain audio/video compression standard, carries the non-audio/video and appears in the compressed form.

As a transformation of the embodiment of the disclosure, when the information stream CAVS formed by compressing the "audio/video information" is compressed audio/video information output by an existing device such as network camera and video server on the present market except for the software and hardware module of the disclosure, the embodiment may be simplified to merely comprise the multi-information mixer BIII2B and the multi-information file recorder III4, and the digital audio/video synchronous collector III1, the digital audio receiver III11 and the digital video receiver III12 that are connected with the digital audio/video synchronous collector III1, and the digital information compressor BIII3B module are omitted. The system has the advantage that the information source output by an existing external audio/video device, which is able to output the compressed audio/video information, such as network camera and video server on the present market, may be used as a carrier of "additional information blocks", such that the software and hardware overhead of the technical device of the disclosure is reduced; in other words, at this moment, the overall cost may be saved.

There are the following several applications of applying the multi-information modulation unit of the first example or the second example to the method for synchronously recording the multi-information.

(1) A simple method for synchronously recording multimedia multi-information for single-channel audio/video information:

① when there merely has the "/video stream" in the "audio/video stream", the "additional information block" formed by the "non-audio/video information" is inserted in the form of taking an "additional information frame S33$x$" as a carrier, wherein the "additional information frame S33$x$" is created between adjacent two frames of the video stream V33$x$ and V33$x$1 (referring to FIG. 3-3);

② when there merely has the "audio stream" in the "audio/video stream", the "additional information block" formed by the "non-audio/video information" is inserted in the form of taking an "additional information frame S34$y$" as a carrier, wherein the "additional information frame S34$y$" is created between adjacent two frames of the audio stream A34$y$ and A34$y$1 (referring to FIG. 3-4); and ③ when there simultaneously includes the "video" and the "audio" in the "audio/video stream", the "additional information block" formed by the "non-audio/video information" is inserted in the form of taking an "additional information frame" as a carrier, wherein the "additional information frame" is created between adjacent two frames of the video stream, or created between adjacent two frames of the audio stream, or created between the adjacent two frames of the video stream and simultaneously created between the adjacent two frames of the audio stream.

The above is the most convenient and direct method for synchronously reproducing the multimedia multi-information and is applied for storing information in various occasions undemanding on the information security.

(2) A safer method for synchronously reproducing multimedia multi-information for single-channel audio/video information:

① when there merely has the "video stream" in the "audio/video stream", the "additional information block a" formed by the "non-audio/video information" is embedded into the "video stream" and into an x$^{th}$ video frame corresponding to a time point when the "non-audio/video information" occurs; referring to FIG. 3-5, V35 is a video information set of a certain frame of the "video stream" which carries the "additional information block a";

② when there merely has the "audio stream" in the "audio/video stream", the "additional information block b" formed by the "non-audio/video information" is embedded into the "audio stream" and into a y$^{th}$ audio frame corresponding to a time point when the "non-audio/video information" occurs; referring to FIG. 3-6, V36 is an audio information set of a certain frame of the "audio stream" which carries the "additional information block b";

③ when there simultaneously includes a "video stream" and an "audio stream" in the "audio/video stream", the "additional information block a/b" formed by the "non-audio/video information" is inserted into the "video stream" and into some video frames corresponding to a time point when the "non-audio/video information" occurs, or inserted into the "audio stream" and into some audio frames corresponding to a time point when the "non-audio/video information" occurs, or inserted into the "video stream" and into some video frames corresponding to a time point when the "non-audio/video information" occurs and inserted into the "audio stream" and into some audio frames corresponding to a time point when the "non-audio/video information" occurs (referring to FIG. 3-5, FIG. 3-6); and ④ according to the need, the "additional information blocks a1, a2/b1, b2" formed by the "non-audio/video information" may be individually inserted, in the form of taking an "additional information frame S37$x$" as a carrier, wherein the "additional information frame S37$x$" is created between adjacent two frames of the video stream V37$x$ and V37$x$1, into a "video stream" formed by an "X$^{th}$ video frame" into which the "additional information block a1" has been embedded and an "X+1$^{th}$ video frame" into which the "additional information block a2" has been embedded. Referring to FIG. 3-7, the V37$x$ and the V37$x$1 are all video information sets of some two frames in the "video stream" which carries the "non-audio/video information" NAVS. The S37$x$ is the "additional information frame" which is inserted between adjacent two video frames, carries a "non-audio/video information block" and is independent of the video frames.

Alternatively, the "additional information blocks a1, a2/b1, b2" formed by the "non-audio/video information" are inserted, in the form of taking an "additional information frame S38$y$" as a carrier, wherein the "additional information frame S38$y$" is created between adjacent two frames of the audio stream V38$yx$ and V38$y$1, into an adjacent audio frame of an "audio stream" formed by a "y$^{th}$ audio frame" into which the "additional information block b1" has been embedded and a "y+1$^{th}$ audio frame" into which the "additional information block b2" has been embedded. The A38$y$ and A38$y$1 are all audio information sets of some two frames in the "audio stream" which carries the "non-audio/video information" NAVS. The A38$y$ is the "additional information frame" which is inserted between adjacent two audio frames, carries a "non-audio/video information block" and is independent of the video frames.

According to the need, the above two methods may be employed simultaneously, i.e., the "additional information blocks", while being embedded into some video frames of a "video stream", are inserted between adjacent two frames of the "video stream" in the form of taking an "additional information frame" as a carrier, wherein the "additional information frame" is created between the two adjacent frames of the video stream. Furthermore, the "non-audio/video information" is not only take as the "additional information blocks" to be embedded into some audio frames of an "audio stream", but also inserted between adjacent two frames of the "audio stream" in the form of taking an "additional information frame" as a carrier, wherein the "additional information frame" is created between the two adjacent frames of the audio frame (referring to FIG. 3-7 to FIG. 3-8).

Example 3

A system C for synchronously reproducing multimedia multi-information for multi-channel audio/video information:

the basic structure of the system is the same as the first embodiment or the second embodiment. The difference lies in that the system is further provided with a data collection unit connected with a multi-information modulation unit. The data collection unit comprises a video information collecting member I (referring to FIG. 1) and an audio information collecting member II (referring to FIG. 2). The video information collecting member I includes: h analog video cameras I11, I12 . . . I1h or k digital video cameras I221, I222 . . . I22k, configured to perform video monitoring and record and provide site video information; h video digital collectors or modules I211, I212 . . . I21h, the h video digital collectors being respectively and correspondingly connected with the h analog video cameras, configured to respectively convert analog video information collected by the analog video cameras into digital video information; and video digital mixers or modules I3, the video digital mixers I3 being respectively connected with the h video digital collectors or modules and the k digital video cameras, configured to convert h+k input channels of digital video information into single-channel digital video information CVS to output, wherein the values of the above h and k are as follows: h=0, 1, 2 . . . 31, k=0, 1, 2 . . . 31, and h+k=1, 2, 3 . . . 32.

The audio information collecting member of the data collection unit II includes:

m analog audio pickups II11, II12 . . . II1m or n digital audio pickups II31, II32 . . . II3n, configured to perform audio monitoring and record site audio signals, wherein the values of the above m and n are as follows: m=0, 1, 2 . . . 31, n=0, 1, 2 . . . 31, and m+n=1, 2, 3 . . . 32;

analog audio signal mixers II2, which are analog audio signal mixing circuits configured to mix m-channel output signals of the analog audio pickups into single-channel analog audio signals HAS;

audio digital collectors or modules II30, configured to convert analog audio signals of the single-channel analog audio signals HAS into digital audio information, wherein the single-channel analog audio signals HAS is mixed from the m-channel analog audio information collected by the m analog audio pickups; and audio digital mixers or modules II4, the audio digital mixers or modules II4 being respectively connected with the audio digital collectors or modules II30 and n digital audio pickups II31, II32 . . . II3n, configured to convert m+n input channels of digital audio information into single-channel digital audio information DAS to output, wherein the values of the above m and n being as follows: m=0, 1, 2 . . . 31, n=0, 1, 2 . . . 31, and m+n=1, 2, 3 . . . 32.

Through the video information collecting member I, before a multi-channel video is recorded, all video information is combined into single-channel video information CVS using the "video digital mixers", before a multi-channel audio is recorded, all analog audio information is combined into single-channel analog audio information HAS using the II2 "analog audio signal mixers", and after passing through the II30 "audio digital collectors", then becomes into the single-channel digital audio information DAS with the digital audio information from the "digital audio pickups II3n" via the II4 "digital audio mixers"; then, by adopting the "multi-information modulation unit" of the system in the first embodiment or the second embodiment, some "non-audio/video information" is embedded into "audio/video stream" corresponding to the time point when the information having an association relationship occurs and then is synchronously reproduced using a dedicated synchronous reproducing unit IV.

As a transformation of the embodiment of the disclosure, the information modulation unit is a software and hardware device capable of enabling additional information in generated multimedia multi-information audio/video stream CMSAV or multimedia multi-information file CMSAVF to become an information stream having a certain security level and being encrypted.

To guarantee the information to be secure and reliable, and to improve the security of the multimedia multi-information audio/video stream CMSAV or the multimedia multi-information file CMSAVF in storage and management, the synchronous reproducing unit IV is a device having the following functions.

① The synchronous reproducing unit IV is a dedicated software or hardware device for reproducing and playing-back the multimedia multi-information audio/video stream CMSAV or multimedia multi-information file CMSAVF, that is, a multimedia multi-information audio/video stream CMSAV or multimedia multi-information file CMSAVF dedicated player. Through the proprietary technology of the disclosure, the complete data information reproduction and synchronization effect can be implemented.

② The multimedia multi-information audio/video stream CMSAV or multimedia multi-information file CMSAVF dedicated player merely provides functions associated with the reproduction and playback and does not provide an editing function such as falsifying.

③ The multimedia multi-information audio/video stream CMSAV or multimedia multi-information file CMSAVF dedicated player, by virtue of a tracking function, realizes the means of reviewing the permission of a playing operator and recording the information of the operator, prevents an unauthorized person from using freely and frightens an illegal user, and thus, the security of the multimedia multi-information audio/video stream CMSAV and the multimedia multi-information file CMSAVF in storage and management is increased.

As a transformation of the embodiment of the disclosure, except for being applied to forming the multimedia multi-information file CMSAVF, capable of carrying the non-audio/video information having a relatively fixed time difference with the time point when these audio/video stream occur and capable of being synchronously reproduced, in real time using a plurality of the audio streams and the video streams, the system hardware platform V further may form a new multimedia multi-information file CMSAVF that carries additional information such as picture, image, text and sound provided by a user in additional to existing information of an "original multimedia file" and has a security protection function on the additional information, using a common multimedia file, and enables the new multimedia multi-information file CMSAVF to seem to still be the audio/video stream or files thereof in a previous format to a common multimedia player. That is to say, when the multimedia multi-information file CMSAVF is played using the common multimedia player, all "additional information" cannot be displayed. And only are the synchronous reproducing unit IV and/or the system hardware platform V of the disclosure utilized, the relevant "additional information" can be reproduced.

Embodiment 4

Figure 11:
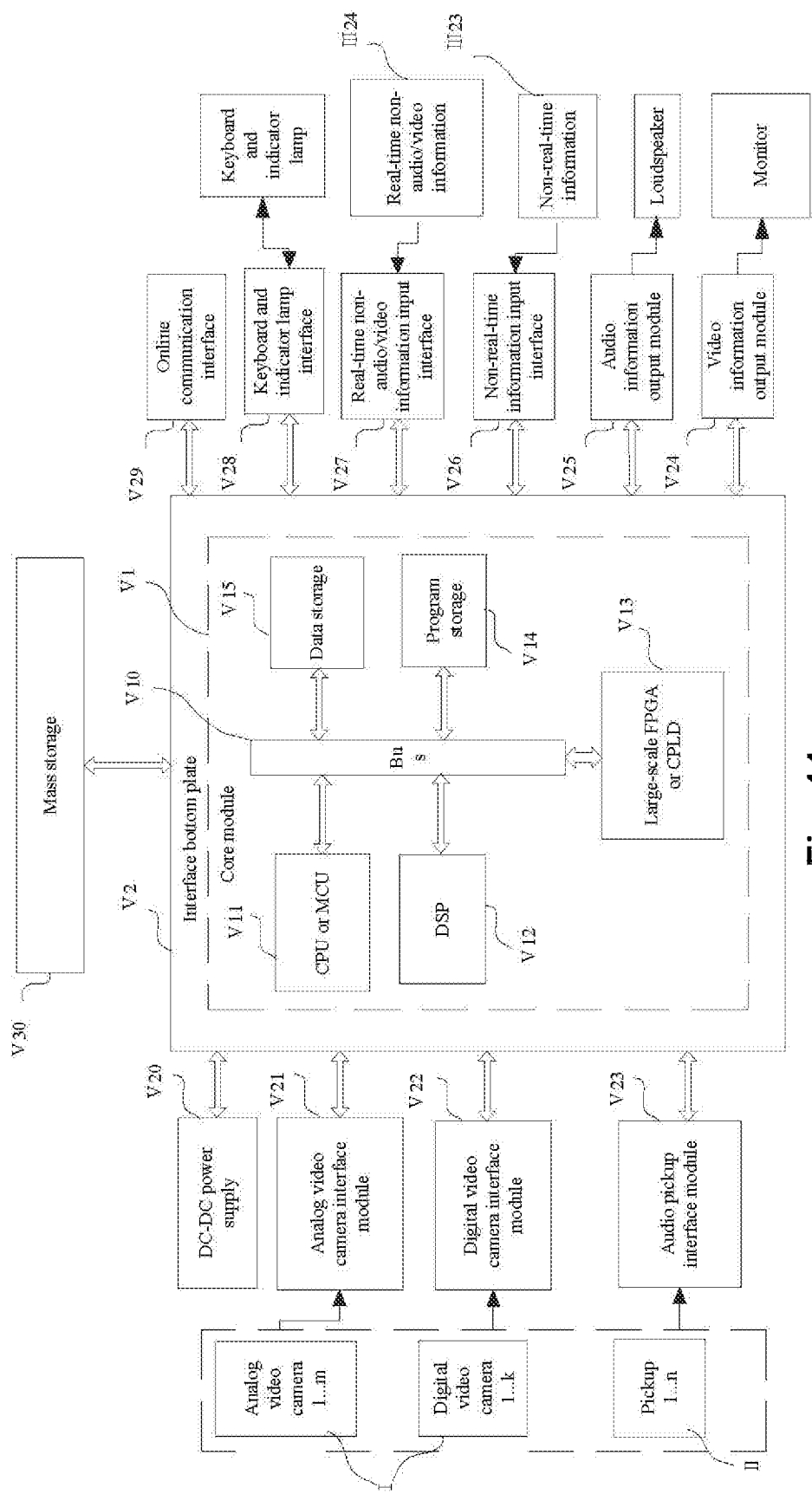
FIG. 11 is an overall structure diagram of a system in the disclosure.

According to the embodiments of the disclosure, the embodiment of a system for synchronously reproducing multimedia multi-information is further provided. As shown in FIG. 11, the system includes a video information collecting member of a data collection unit I, an audio information collecting member of the data collection unit II, a data storage unit III, a synchronous reproducing unit IV, and a system hardware platform V. The system hardware platform V includes a hardware platform core module V1 and a hardware platform interface bottom plate V2. The video information collecting member of the data collection unit I is a device I configured to convert a multi-channel video into single-channel video information. The audio information collecting member of the data collection unit II is a device II configured to convert multi-channel audio information into single-channel audio information. The data storage unit III is a member for compressing various information collected by the collection unit in the driving testing process with real-time non-audio/video test information such as all testee information relevant to the driving test, test scores, tester information and test vehicle information, and non-real-time test information together into a "driver testing process multi-information audio/video file DEMSAV". The synchronous reproducing unit IV is a member capable of synchronously reproducing and playing back the "driver testing process multi-information audio/video file DEMSAV". The system hardware platform V includes all required members which are able to be operated to generate the "driver testing process multi-information audio/video file DEMSAV" and to play the "driver testing process multi-information audio/video file DEMSAV". The platform here includes but not limited to a universal PC computer with a CPU compatible to an x86 series as a central processor, a tablet computer with an MCU compatible to an ARM series as a central controller, a mobile terminal which is commonly seen at present such as intelligent mobile phone, as well as all members and function extension members which are customized and dedicated to operating to generate the "driver testing process multi-information audio/video file DEMSAV" and are required to play the "driver testing process multi-information audio/video file DEMSAV" The members here include hardware devices and software embedded into the hardware devices.

Figure 10:
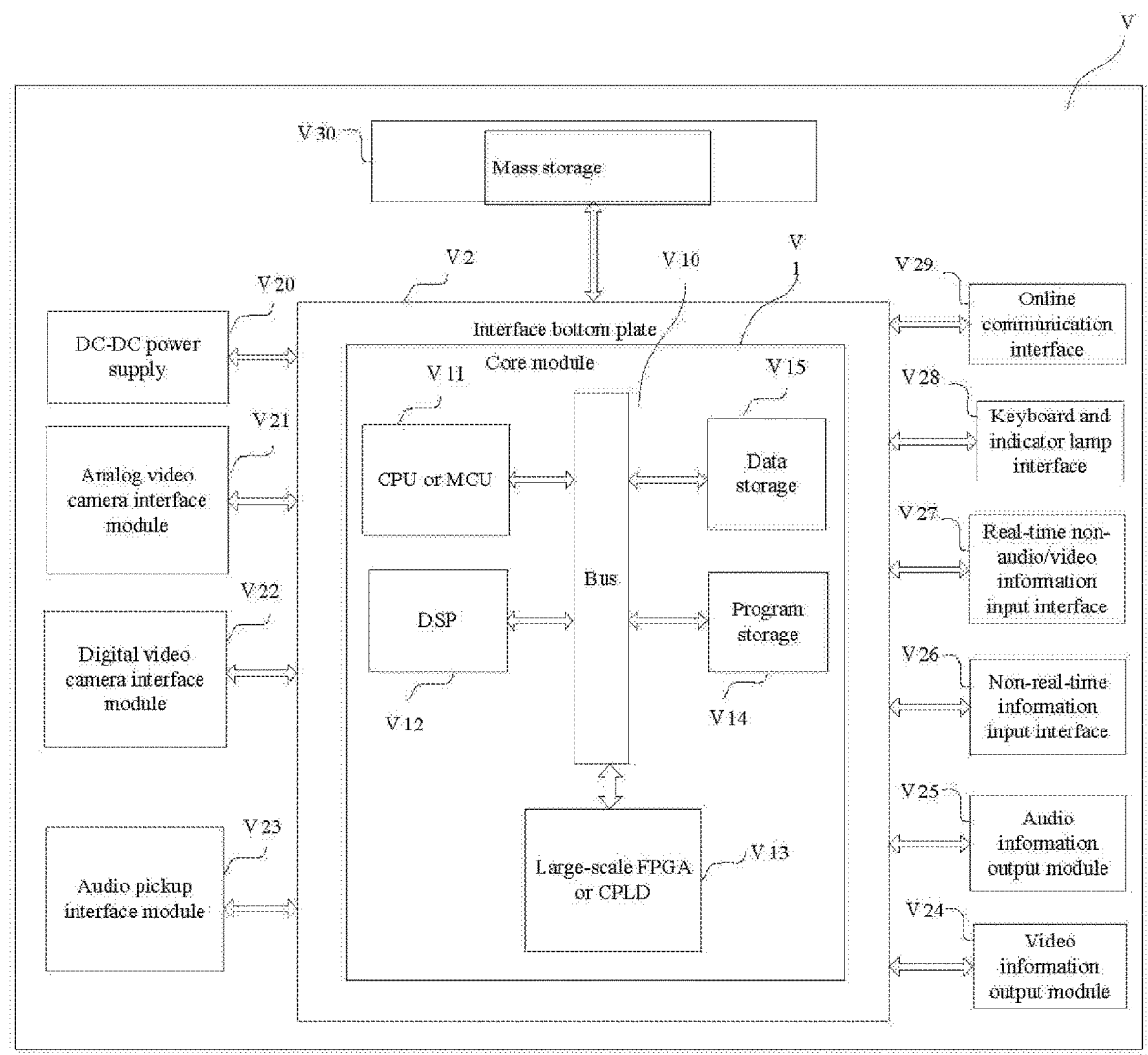
FIG. 10 is a structure diagram of a hardware implementing platform of a system in the disclosure.

As shown in FIG. 10, the system hardware platform includes a hardware platform core module V1, and a hardware platform interface bottom plate V2.

The hardware platform core module V1 includes:

various buses V10 on the core module, which are common channels configured to enable the CPU or the MCU or a DSP to be able to obtain data required in an operation and to access all devices connected with the bottom plate;

the CPU or the MCU V11, configured to operate the all members required for generating the "driver testing process multi-information audio/video file DEMSAV" and playing the "driver testing process multi-information audio/video file DEMSAV";

the DSP V12, configured to assist the CPU or the MCU to work, accelerate the system operating speed and reduce the software and hardware overhead; an large-scale FPGA or a CPLD V13, configured to generate a dedicated hardware circuit or replace some universal hardware circuit so as to assist the CPU or the MCU to work, accelerate the system operating speed and reduce the software and hardware overhead;

a program storage V14, which is a hardware carrier configured to store the all software which is operated to generate the "driver testing process multi-information audio/video file DEMSAV" and is required to play the driver testing process multi-information audio/video file DEMSAV; and a data storage V15, configured to provide a data buffer area and a dynamic or temporary data storage space required when operating the all software required for generating the "driver testing process multi-information audio/video file DEMSAV" and playing the "driver testing process multi-information audio/video file DEMSAV".

The CPU or the MCU V11, the DSP V12, the large-scale FPGA or the CPLD V13, the program storage V14 and the dynamic data storage V15 are mutually connected via the various buses V10.

The hardware platform interface bottom plate V2 is configured to be connected with output and input interfaces of the data collection unit, the data storage unit and the synchronous reproducing unit.

The hardware platform interface bottom plate V2 includes:

an 8-36V input DC-DC power supply V20, which provides the whole hardware platform with all electric energies required when the whole hardware platform operates;

an analog video camera interface module V21, which is a hardware interface for sending video data of analog video cameras to the core plate V1 and through which the total number of the analog video cameras allowed to be accessed is m;

a digital video camera interface module V22, which is a software interface for sending video data of digital video cameras to the core plate V1 and through which the total number of the digital video cameras allowed to be accessed is k;

an audio pickup interface module V23, which is a hardware interface for sending analog audio signals output by pickups to the core plate V1 and through which the total number of the pickups allowed to be accessed is n;

a video information output module V24, which is a hardware interface for converting CVS into analog signals and then outputting to the outside, i.e., a hardware interface, for outputting the analog video signals to the outside, of an analog video monitor I6;

an audio information output module V25, which is a hardware interface, of an analog audio monitor II41 and for providing analog audio monitoring signals, from an analog audio distributor II3, to the outside, for outputting audio signals to the outside;

a non-real-time information input interface V26, which is a software and hardware interface for enabling the core plate to obtain non-real-time signals;

a real-time non-audio/video information input interface V27, which is a software and hardware interface for enabling the core plate to obtain real-time non-audio/video signals;

a keyboard and indicator lamp interface V28, which is a man-machine interface for associating an operator with the core plate;

an online communication interface module V29, which is a software and hardware interface for connecting the system of the disclosure with external other systems or devices; and a mass storage V30, which is external storage hardware added necessarily to store the "driver testing process multi-information audio/video file DEMSAV", including one or more combinations of a computer hard disk, a solid state storage, a USB disk, an SD card or a TF card commonly used at present; and according to the demand, it also may be other external storage hardware having functions of the mass storage.

As shown in FIG. 6-1, the video information collecting member of the data collection unit I includes: m analog video cameras I11, I12 . . . I1m or k digital video cameras I221, I222 . . . I22k, configured to perform video monitoring, record a testing process and provide site video information; m video digital collectors I211, I212 . . . I21m, the m video digital collectors being respectively and correspondingly connected with the m analog video cameras, configured to convert analog video information collected by the video cameras into digital video information; and video digital mixers or modules I3, the video digital mixers I3 being respectively connected with the m video digital collectors or modules and the k digital video cameras, configured to convert m+k input channels of digital video information into single-channel digital video information CVS to output.

The values of the above m and k are as follows: m=0, 1, 2 . . . 8, k=0, 1, 2 . . . 8, and m+k=1, 2, 3 . . . 8.

As shown in FIG. 7, the audio information collecting member of the data collection unit II includes: n audio pickups II1, II12 . . . II1n, configured to perform audio monitoring, record a driver testing process and provide site audio signals, wherein the values of the n are as follows: n=0, 1, 2 . . . 6; and analog audio signal mixers I12, configured to mix n channels of pickup signals monitored in the driver testing process into single-channel mixed audio information HAS to be transmitted and processed merely needing one channel.

Figures 3, 4, 5, 6, 7, 8:
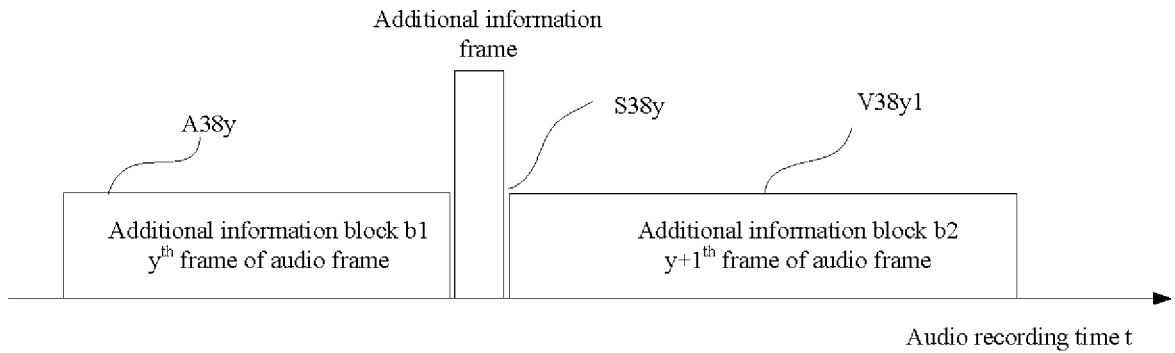
Figure 4:
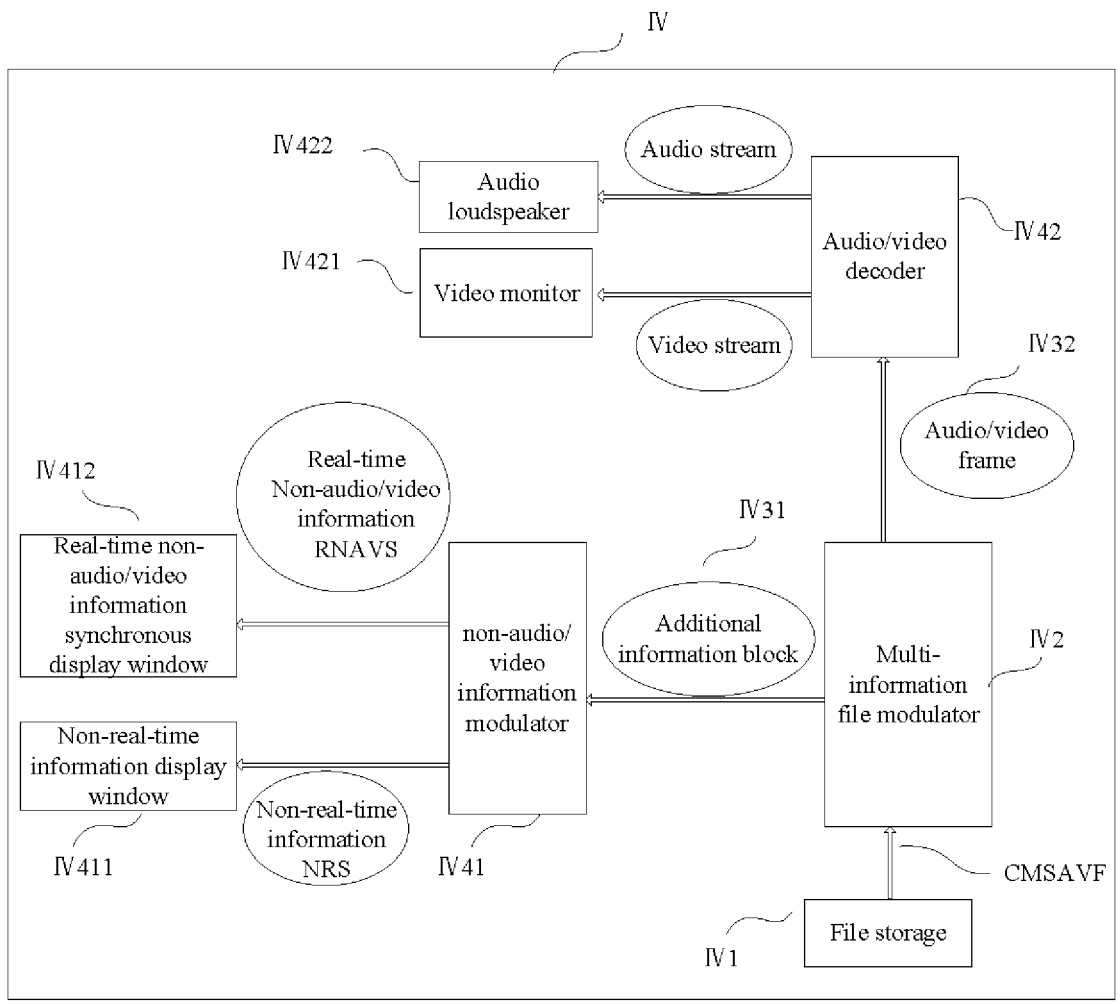
Figure 5:
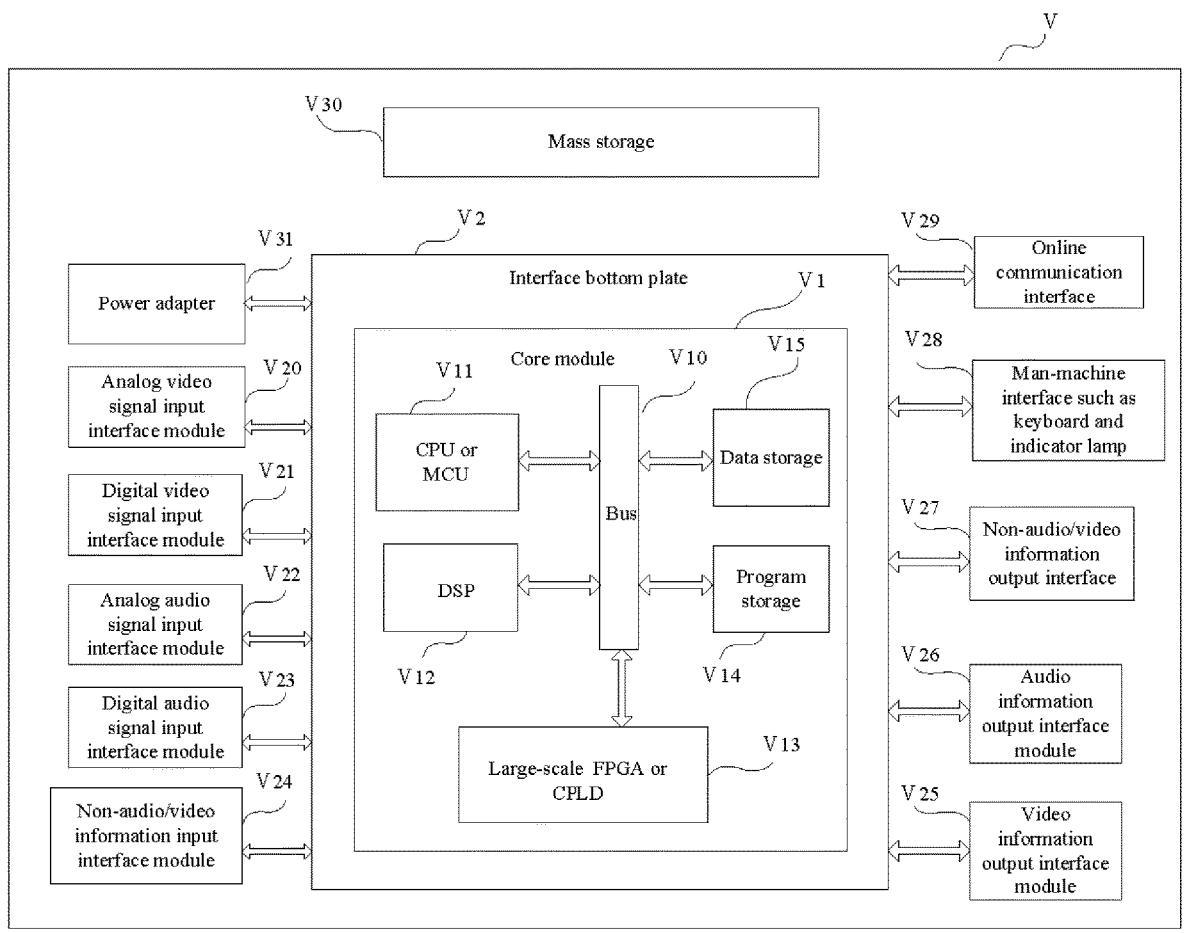
Figures 1, 6:
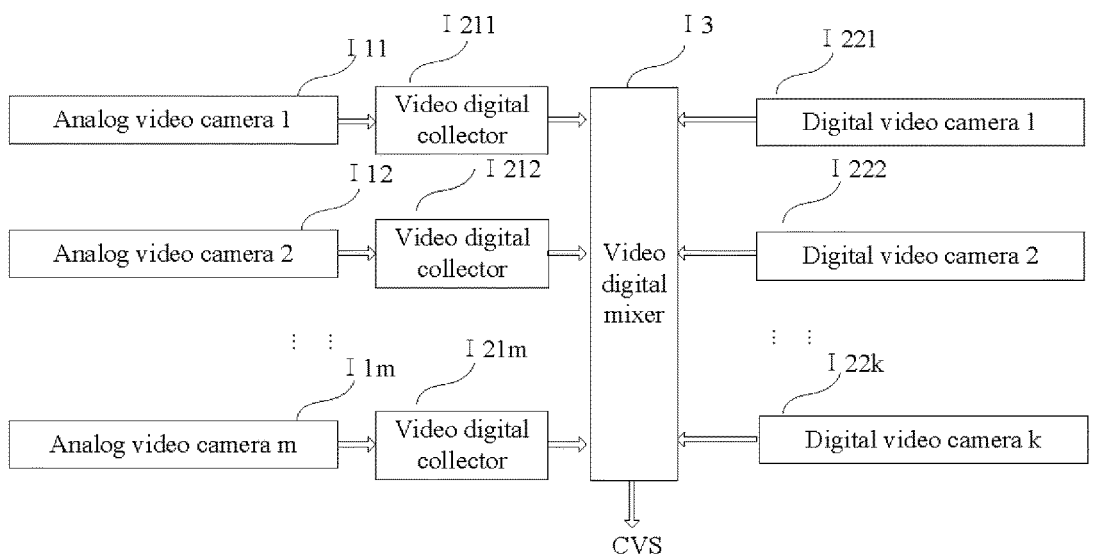
Figures 2, 6:
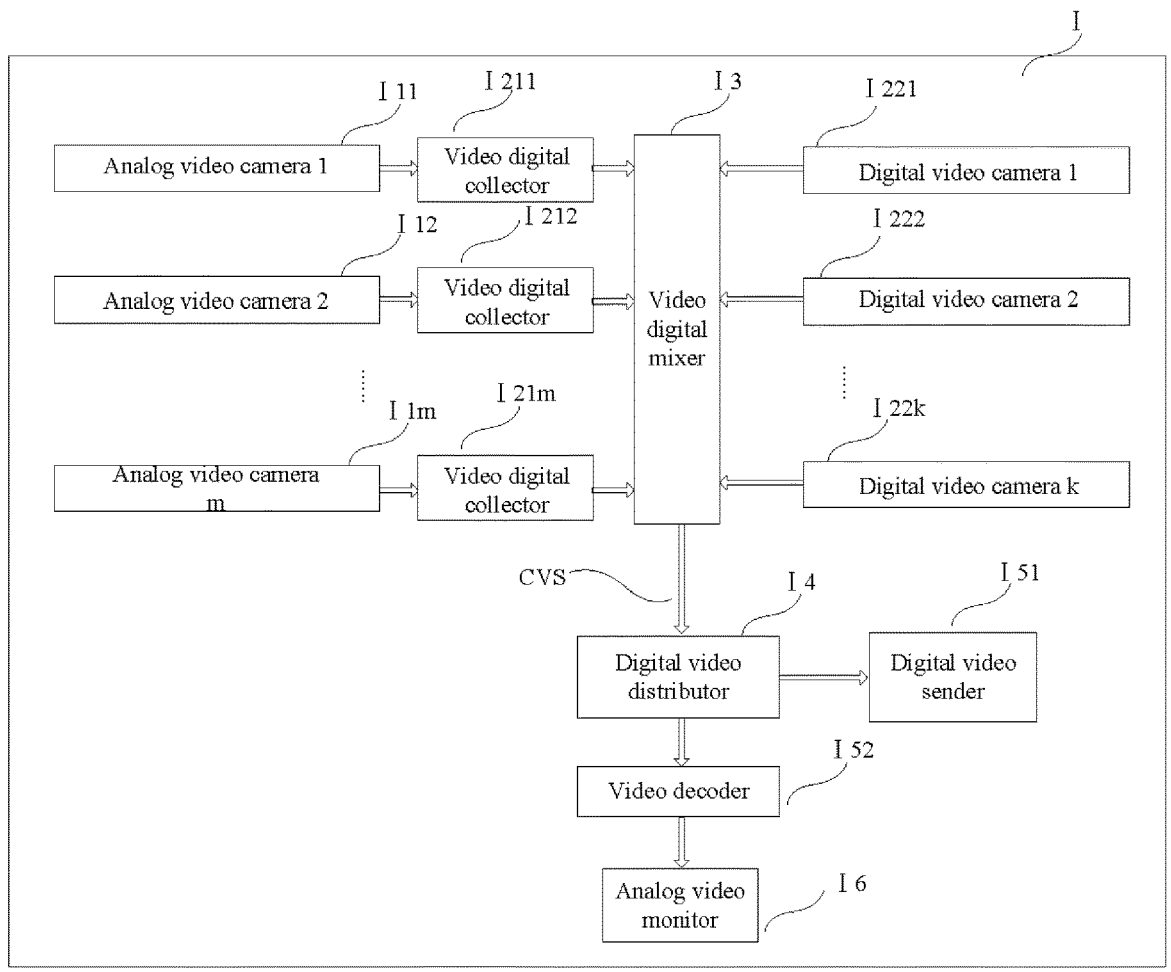
Figure 7:
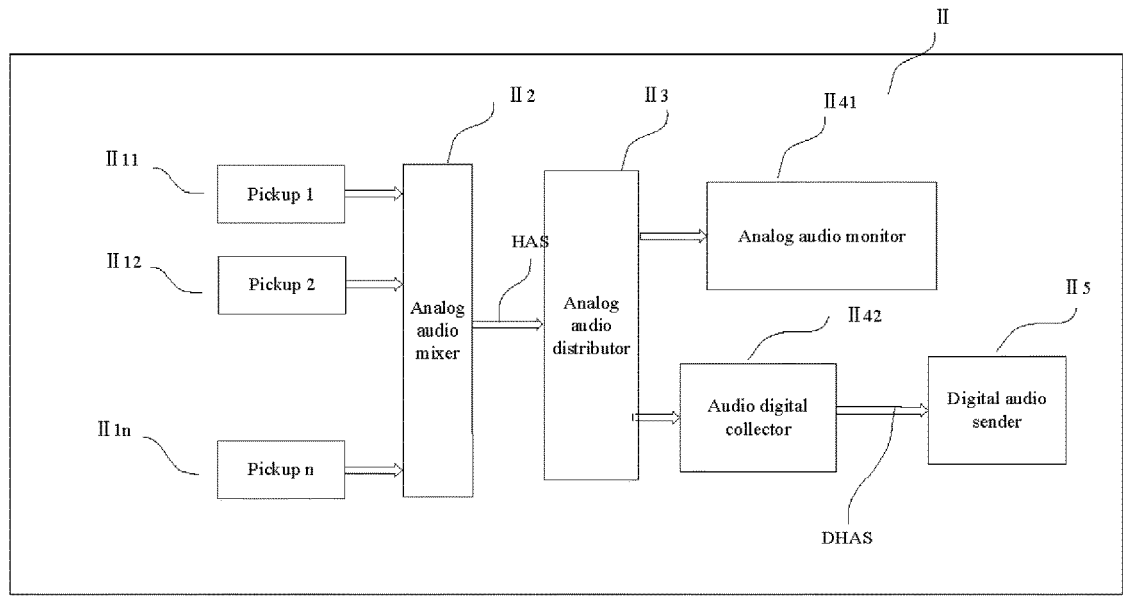
Figure 8:
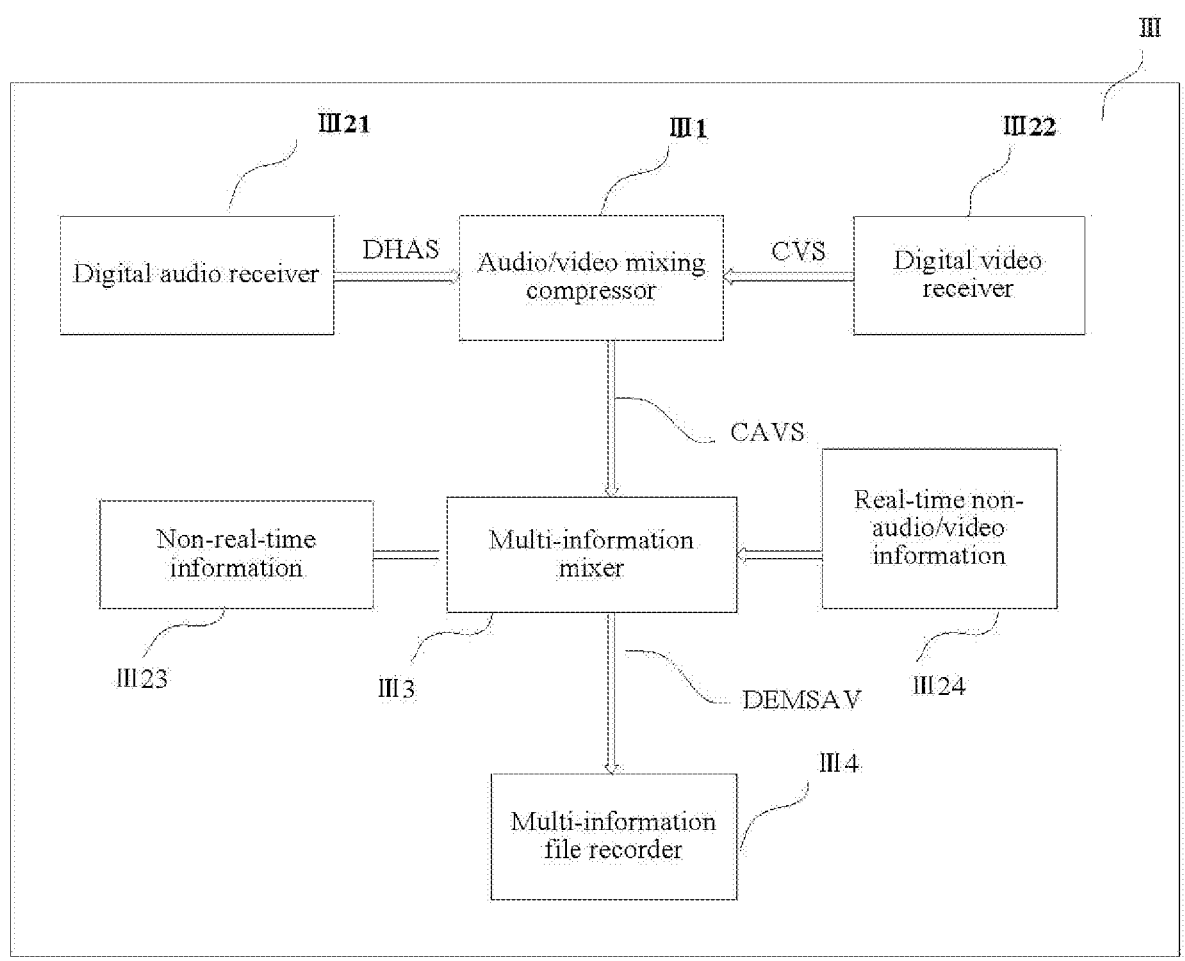

As shown in FIG. 8, the data storage unit III includes:

an audio/video mixing compressor III1, which is a signal processor configured to mix digital audio data DHAS and digital video information CVS formed by the audio information HAS via the digital processing together such that the digital audio data DHAS and the digital video information CVS are formed into a CAVS information stream that is able to be transmitted conveniently, is used according to the requirements of applications and includes the audio/video information;

a multi-information mixer III3, which is a digital information processor and is configured to embed the "non-real-time information" III23 and the "real-time non-audio/video information" III24 simultaneously in real time into the information stream CAVS that is processed by the "audio/video mixing compressor" III1 and includes the audio and video information from the "digital audio receiver III21" and the "digital video receiver III22", thereby finally forming a data information stream DEMSAV that merely has single channel, has been encrypted and includes all information of the driving testing process;

a multi-information file recorder III4, which is a carrier for storing the "driver testing process multi-information audio/video file DEMSAV", refers to an electronic information recording device which comprises software and hardware having a function for implementing recording on an electronic file in the form of any one of electricity, magnetism and light or any combination, configured to record, in the form of the electronic file, the DEMSAV of the data information stream that is formed by the "multi-information mixer III3", merely has single channels, has been encrypted and includes the all information of the driving testing process, as to obtain an electronic "multi-information file" that may be used in applications such as storing, querying, coping, spreading and communicating, i.e., a "driver testing process multi-information audio/video file: DEMSAV file".

The digital video receiver III22 is an electronic information interface for receiving the digital video information transmitted from a digital video sender I51. Through the interface here, the digital video information transmitted to the interface may be obtained.

The digital audio receiver III21 is an electronic information interface for receiving the digital audio information transmitted from a digital audio sender II5. Through the interface here, the digital audio information transmitted to the interface may be obtained.

The non-real-time information III23 refers to information irrelevant to a time course of the testing process; according to the standard testing judgment requirements of Ministry of Public Security, it is considered that the existing non-real-time test information includes but not limited to testee information, test car information, tester information, test scores and the like, and the types of these non-real-time test information will be changed along with the ministry standard.

The real-time non-audio/video information III24 refers to, according to the standard testing judgment requirements of Ministry of Public Security, it is considered that the existing real-time non-audio/video test information includes but not limited to a position coordinate value of the test car, a travelling track, represented by the position coordinate value, of the test car, a position of the test car when a score deduction point occurs according to the testing judgment standard, a signal for constraining the test scores on the test car and moment-to-moment information at that time, and the types of these real-time non-audio/video test information will be changed along with the ministry standard.

Figure 9:
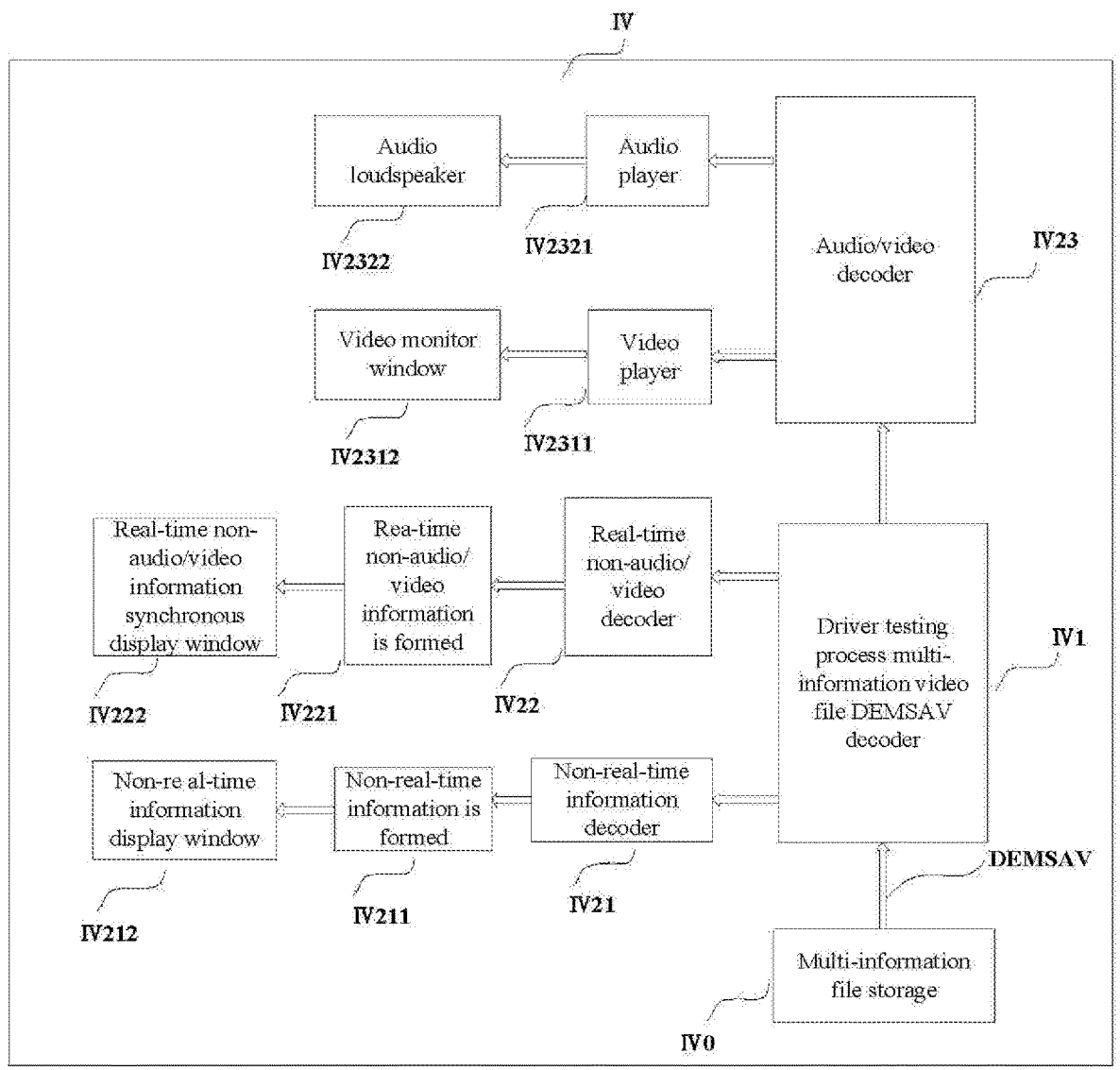
FIG. 9 is a structure diagram of a synchronous reproducing unit of a system in the disclosure.

As shown in FIG. 9, the synchronous reproducing unit IV includes:

a driver testing process multi-information audio/video file DEMSAV decoder IV1, which is a member for respectively separating and extracting recorded audio/video information, real-time non-audio/video information and non-real-time information of the driver testing process out from the DEMSAV file;

a non-real-time information decoder IV21, which is a member for decompressing and decrypting the "non-real-time information" separated out from the "driver testing process multi-information audio/video file DEMSAV" according to the requirements of the "non-real-time information", wherein a non-real-time information forming member IV21 is a member for sending the information obtained from the non-real-time information decoder IV21 to a display window buffer area according to the requirements of a man-machine interface, and a non-real-time information display window IV212 is a display buffer area for displaying a man-machine interface window of the non-real-time information;

a real-time non-audio/video decoder IV22, which is a member for decompressing and decrypting the "real-time non-audio/video information" separated out from the "driver testing process multi-information audio/video file DEMSAV" according to the requirements of the "real-time non-audio/video information", wherein a real-time non-audio/video information forming member IV221 is a member for sending the information obtained from the "real-time non-audio/video information decoder" IV22 to the display window buffer area according to the requirements of the man-machine interface, and a real-time non-audio/video information display window IV222 is a display buffer area for displaying a man-machine interface window of the real-time non-audio/video information;

an audio/video decoder IV23, which is a member for decompressing and decrypting the "audio/video information" separated out from the "driver testing process multi-information audio/video file DEMSAV" according to the requirements of the "audio/video information", wherein a video player member IV2311 is a member for sending video information obtained from the audio/video information decoder IV23 to the display window buffer area according to the requirements of the man-machine interface;

a video monitor window IV2312 is a display buffer area for displaying a man-machine interface window of the video information;

an audio player member IV2321 is a member for sending audio information obtained from the audio/video information decoder IV23 to a digital audio buffer area according to the requirements of the man-machine interface;

an audio loudspeaker IV2322 is a member for converting digital audio data of the digital audio buffer area into analog audio data and sending to an analog audio output interface.

The above are basic members indispensable for the "system for improving the security of the driving test information and synchronously reproducing the driving test information" of the disclosure.

As a transformation of the embodiment of the disclosure, as shown in FIG. 6-2, the video information collecting member of the data collection unit I further includes the following extension modules:

a "digital video distributor" I4, which is a device for adding the extension modules which is able to provide the CVS video data simultaneously for a plurality of users, software and hardware devices;

a "digital video sender" I51, which provides a protocol interface for converting m+k channels of digital video signals into single-channel digital video signals CVS for the outside;

a "video decoder" I52, which is a device for restoring the CVS digital video information into the analog video information; and an "analog video monitor" I6, which is a protocol interface, and is an interface member for providing a household television or similar other video display devices that may be used and are provided with a video input interface with a video monitoring signal.

Any one or two or three of the above members are selected according to user's needs.

As shown in FIG. 7, the audio information collecting member of the data collection unit II further includes the following extension modules:

an "analog video distributor" II3, which is a device for adding the extension modules which is able to simultaneously meet the requirements of a plurality of users, software and hardware devices;

an "analog audio monitor" II41, which is a redundant interface circuit added for monitoring the analog audio information after being mixed;

an "audio digital collector" II42, which is a device for converting analog audio information into digital audio information and is a necessary software, hardware or their mixed device that provides digitalized audio information for the rear "audio information digital processing" process; and a "digital audio sender" II5, which is a device that is able to provide the digitalized digital audio information for the "outside" or a "third party" to use and also pertains to a digital audio information protocol interface.

As another transformation of the embodiment of the disclosure, the audio/video mixing compressor III1 further may be a software and hardware device capable of enabling the generated CAVS information to become an information stream having a certain security level and being encrypted.

As still another transformation of the embodiment of the disclosure, to guarantee the information to be secure and reliable, and improve the security of the DEMSAV file in storage and management, the synchronous reproducing unit IV further has the following functions.

① A dedicated DEMSAV file reproducing and playing-back software or hardware device implements the complete data information reproduction and synchronization effect.

② A driver testing process multi-information audio/video file DEMSAV dedicated player merely provides functions associated with the reproduction and playback and does not provide an editing function such as falsifying.

③ The driver testing process multi-information audio/video file DEMSAV dedicated player, by virtue of a tracking function, realizes the means of reviewing the permission of a playing operator and recording the information of the operator, prevents an unauthorized person from using freely and frightens an illegal user, and thus, the security of the DEMSAV file in storage and management is increased.

The serial numbers in the embodiments of the disclosure are merely for description and does not indicate whether the embodiments are good or bad.

In the above embodiments of the disclosure, different priorities are placed for the description on each of the embodiments. Any part not described in detail in some embodiment may be referred to relevant description in other embodiments.

In the several embodiments provided in the disclosure, it should be understood that the disclosed technical contents may be implemented in other manners. Herein, the described apparatus embodiment is merely exemplary. For example, the unit division may be logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in a form of a software functional unit and sold or used as an independent product, the integrated unit may be stored in a computer-readable storage medium. Based on such an understanding, the technical solutions of the embodiment of the disclosure substantially or a part with contributions to the conventional art may be embodied in form of software product in whole or in part. The computer software product is stored in a storage medium and includes several instructions for instructing a computer device (which may be a personal computer, a server, or a network device) to perform a part of the steps of the methods described in the embodiments of the disclosure. The foregoing storage medium includes: any medium that may store program code, such as a USB flash drive, a read-only storage (Read-Only Storage, ROM), a random access storage (Random Access Storage, RAM), a removable hard disk, a magnetic disk, or an optical disc.

The above are only exemplary embodiments of the disclosure. It should be noted that a person of ordinary skill in the art further may make a plurality of modifications and improvements without departing from the principles of the disclosure, and these modifications and improvements shall all fall within the protection scope of the disclosure.

What is claimed is:

1. A method for synchronously reproducing multimedia multi-information, wherein the method is implemented by combining a plurality of relevant files or a plurality of information streams by a multi-information modulation unit, and then synchronously reproducing the plurality of relevant files or the plurality of information streams by a dedicated player capable of synchronously reproducing and playing back multi-information, wherein the plurality of relevant files have an associated relationship, the plurality of information streams have the associated relationship; the method comprises following basic steps:

A, a step of synchronously recording the multi-information:

wherein, embedding, by a multi-information mixer of the multi-information modulation unit, additional information blocks carrying non-audio/video information into necessary video frames or audio frames in the audio/video stream before compression; or embedding the additional information blocks carrying the non-audio/video information into necessary video frames or audio frames in the audio/video stream after compression;

and/or, inserting, by the multi-information mixer of the multi-information modulation unit, some additional information frames carrying the non-audio/video information between the necessary video frames and audio frames, to form a new multimedia multi-information audio/video stream CMSAV or multimedia multi-information file CMSAVF, wherein the multimedia multi-information audio/video stream CMSAV and the multimedia multi-information file CMSAVF meets requirements of a certain compression standard; and B, a step of synchronously reproducing the multi-information:

the multimedia multi-information file CMSAVF, which carries the non-audio/video information and is in an audio and a video format which meets the requirements of the certain compression standard, is processed by a multi-information file demodulator by using a multi-information synchronous reproducing unit to respectively obtain three information sets, wherein the three information sets comprises an additional information block set, a video frame set and an audio frame set; and sending the video frames and the audio frames which are taken as basic units of multimedia stream information to an audio/video decoder or player to restore audio/video information and scenes before being recorded, and performing corresponding demodulation on the additional information blocks obtained by demodulation from the multimedia multi-information file CMSAVF to restore the non-audio/video information embedded into the multimedia multi-information file CMSAVF.

2. The method for synchronously reproducing the multimedia multi-information as claimed in claim 1, wherein in the A, when a media stream carrying the non-audio/video information is multi-channel audio/video information, the media stream meets a synchronization requirement; a synchronous processing method for the multi-channel audio/video is to increase an preprocessing step A0 before the A, the preprocessing step A0 comprises:

A01, the multi-channel video information is mixed into single-channel video information CVS using a video preprocessing unit of a data collection unit;

a method of A01 is to simultaneously collect signals of h channels of analog video cameras and digitalize the signals, or real-time dynamic video signals of k channels of digital video cameras, and at last combine the digitalized signals or the real-time dynamic video signals into digital video signals CVS for later comprehensive processing or simple storing and recording, wherein the digital video signals CVS, merely needing one channel, are able to meet requirements of a national standard and requirements of a user, values of the above h and k are respectively as follows: h=0, 1, 2 . . . 31, k=0, 1, 2 . . . 31, and h+k=1, 2, 3 . . . 32; and A02, the multi-channel audio information is mixed into single-channel audio information DAS using an audio preprocessing unit of the data collection unit;

a method of A02 is to simultaneously mix real-time audio analog signals from m channels of analog audio pickups into single-channel analog audio signals HAS using an analog audio mixing circuit, then perform digital processing and mix, by a digital audio mixer, with real-time audio digital signals from n channels of digital audio pickups into single-channel digital audio signals DAS for taking as signal sources from digital audio pickups and analog audio pickups, wherein the single-channel digital audio signals DAS, merely needing one channel, are able to meet requirements of a national standard and requirements of a user, values of the above m and n are respectively as follows: m=0, 1, 2 . . . 31, n=0, 1, 2 . . . 31, wherein m+n=1, 2, 3 . . . 32.

3. The method for synchronously reproducing the multimedia multi-information as claimed in claim 1, wherein in the A, a method for processing single-channel audio/video information is as follows: first, audio information DAS and video information CVS are collected digitally, synchronously and respectively to obtain an information stream which is an original digital audio/video mixed information stream AVS, wherein the original digital audio/video is not compressed; and then, according to different synchronization time differences, either following A1 or A2 is adopted or the following two methods are adopted simultaneously:

A1: first, the non-audio/video information is inserted into the synchronously collected digital audio/video information AVS using a multi-information mixer to form an information stream of a multi-information audio/video stream MAVS, wherein the multi-information audio/video stream MAVS is formed after the non-audio/video information is added to the AVS;

and then, the information stream is sent to a digital information compressor for compression, thereby finally forming the audio/video information stream CMSAV or the file CMSAVF thereof stored in a file recorder, wherein audio/video information stream CMSAV, which carries the non-audio/video information and appears in a compressed form, is able to meet requirements of the certain audio/video compression standard;

A2: first, the synchronously collected digital audio/video information AVS is sent to the digital information compressor for compression to form a compressed information stream of an audio/video mixed information stream CAVS; and then, the non-audio/video information is inserted using the multi-information mixer, thereby finally forming the audio/video information stream CMSAV or the file CMSAVF thereof stored in a file recorder, wherein audio/video information stream CMSAV, which carries the non-audio/video information and appears in a compressed form, is able to meet requirements of the certain audio/video compression standard, for a condition that an overlong delay time is not allowed, the A1 method is adopted; and for a condition that a relatively long delay time is allowed, the A2 method is adopted, or the A1 method is adopted, or the A1 method and the A2 method are adopted simultaneously;

wherein when the non-audio/video information which needs to be added is associated with a real time point when the non-audio/video information occurs, a method for synchronously processing the audio/video information and additional information of the non-audio/video information is as follows: the additional information which carries the non-audio/video information, and the audio/video information are created on corresponding positions having a constant time difference range on a same time axis, and in playback, are reproduced on same corresponding time positions.

4. The method for synchronously reproducing the multimedia multi-information as claimed in claim 3, wherein in the step of synchronously recording the multi-information, and in the A1 or A2 method, for that the non-audio/video information is inserted into the video frames or the audio frames, which is synchronous to corresponding time, in the audio/video stream before compression or after compression in a form of additional information blocks using the multi-information mixer, there are the following several specific ways: ① when there merely has the video stream in the audio/video stream, the additional information blocks formed by the non-audio/video information are inserted in a form of taking an additional information frame as a carrier, wherein the additional information frame is created between adjacent two frames of the video stream; ② when there merely has the audio stream in the audio/video stream, the additional information blocks formed by the non-audio/video information are inserted in a form of taking an additional information frame as a carrier, wherein the additional information frame is created between adjacent two frames of the audio stream; and ③ when there simultaneously comprises the video and the audio in the audio/video stream, the additional information blocks formed by the non-audio/video information are inserted in a form of taking an additional information frame as a carrier, wherein the additional information frame is created between adjacent two frames of the video stream or created between adjacent two frames of the audio stream or created between the adjacent two frames of the video stream and simultaneously created between the adjacent two frames of the audio stream;

or, wherein in the step of synchronously recording the multi-information and in the A1 or A2 method, for that the non-audio/video information is inserted into the video frames or the audio frames, which is synchronous to corresponding time, in the audio/video stream before compression or after compression in a form of additional information blocks using the multi-information mixer, a specific way is to embed the non-audio/video information into the audio/video stream before compression or after compression or file thereof using the multi-information mixer, that is to embed some additional information blocks carrying the non-audio/video information into the necessary video frames or audio frames in the audio/video stream before compression or after compression or file thereof to form the multi-information file CMSAVF that is the audio and the video;

a method for embedding the additional information blocks carrying the non-audio/video information comprises: ① when there merely has the video stream in the audio/video stream, the non-audio/video information is taken as the additional information blocks to be embedded into some video frames of which a time point is corresponding to a time point when the non-audio/video information occurs in the video stream; or the additional information blocks are embedded into some video frames of the video stream and simultaneously is inserted between two frames of the video stream in a form of taking an additional information frame as a carrier, wherein the additional information frame is created between adjacent two frames of the video stream; ② when there merely has the audio stream in the audio/video stream, the non-audio/video information is taken as the additional information blocks to be embedded into some audio frames of which a time point is corresponding to a time point when the non-audio/video information occurs in the audio stream; or the additional information blocks are embedded into some audio frames of the audio stream and simultaneously is inserted between two frames of the audio stream in a form of taking an additional information frame as a carrier, wherein the additional information frame is created between adjacent two frames of the audio stream; and ③ when there simultaneously comprises the video stream and the audio stream in the audio/video stream, the non-audio/video information is taken as the additional information blocks to be embedded into some video frames of the video stream or be embedded into some audio frames of the audio stream by adopting the method ① or adopting the method ② or simultaneously adopting the method ① and the method ②, or the additional information blocs are embedded into some video frames of the video stream and simultaneously is inserted between adjacent two frames of the video stream in a form of taking an additional information frame as a carrier, wherein the additional information frame is created between adjacent two frames of the video stream, or the non-audio/video information is taken as the additional information blocks to be embedded into some audio frames of the audio stream and is inserted between adjacent two frames of the audio stream in a form of taking an additional information frame as the carrier, wherein the additional information frame is created between the adjacent two frames of the audio frame.

5. The method for synchronously reproducing the multimedia multi-information as claimed in claim 4, wherein,
in the A, the step of synchronously recording the multi-information, the non-audio/video information before being loaded to the audio/video information is encrypted with a common encryption method, and/or, the additional information frame and/or the additional information blocks are further encrypted: a changeable frame structure and/or a changeable block address are/is adopted for encryption, or, a method of splitting one additional information into a plurality of the additional information blocks and/or a plurality of the additional information frames is adopted for encryption;

or, in the step of synchronously reproducing the multi-information, a function of the multi-information file demodulator configured to decode a multi-information stream or a file thereof is limited to allow to read the multi-information stream or the file thereof; however, functions of editing, falsifying and rewriting the additional information added before in the multi-information stream or the file thereof are not provided; an operator performing reproduction and playback and other information is able to be allowed to be secondarily added, according to regulations of a corresponding standard or requirements of a user, to the multi-information stream or the file thereof being reproduced and played back or being used for others, implementing the management function for recording starting of the multi-information stream or the file thereof; and a corresponding file permission is further allowed to be set.

6. The method for synchronously reproducing the multimedia multi-information as claimed in claim 1, wherein when there is no time synchronization requirement among the audio/video stream and the additional non-audio/video, the method for synchronously reproducing the multimedia multi-information as claimed in claim 1 is adopted; some additional information is added to existing audio/video stream files, making the corresponding audio/video stream files into carriers of the some additional information; particularly, with respect to a video file, when the video file merely has one frame or several frames of videos or one picture or several pictures of videos, the file is one or several photos or pictures as a matter of fact;
wherein the method for synchronously reproducing the multimedia multi-information as claimed in claim 1 to website security protection, wherein by adopting the method for synchronously reproducing the multimedia multi-information as claimed in claim 1 and using audio, video and picture files to indicate a website, information to be transferred by the website are all embedded into audio/video information streams that indicate the website;

or, wherein the method for synchronously reproducing the multimedia multi-information as claimed in claim 1 is applied into an information storage or transmission security protection: by adopting the method for synchronously reproducing the multimedia multi-information as claimed in claim 1, information to be confidentially protected are all embedded into some audio/video information streams or audio/video information files or picture/image files for necessary storage or transmission.

* * * * *